United States Patent
Sullenger et al.

(10) Patent No.: US 12,514,872 B2
(45) Date of Patent: Jan. 6, 2026

(54) POLYCATIONIC POLYMERS FOR USE IN TREATING AND DETECTING CANCER

(71) Applicant: Duke University, Durham, NC (US)

(72) Inventors: Bruce A. Sullenger, Durham, NC (US); Ibtehaj Naqvi, Durham, NC (US); Ruwan Gunaratne, Durham, NC (US); Rebekah White, Durham, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 15/773,933

(22) PCT Filed: Nov. 4, 2016

(86) PCT No.: PCT/US2016/060496
§ 371 (c)(1),
(2) Date: May 4, 2018

(87) PCT Pub. No.: WO2017/079537
PCT Pub. Date: May 11, 2017

(65) Prior Publication Data
US 2018/0318337 A1   Nov. 8, 2018

Related U.S. Application Data

(60) Provisional application No. 62/385,586, filed on Sep. 9, 2016, provisional application No. 62/301,034, filed on Feb. 29, 2016, provisional application No. 62/250,700, filed on Nov. 4, 2015.

(51) Int. Cl.
| | |
|---|---|
| *A61K 31/785* | (2006.01) |
| *A61K 9/00* | (2006.01) |
| *A61K 31/724* | (2006.01) |
| *A61K 31/80* | (2006.01) |
| *A61P 35/04* | (2006.01) |
| *C08L 57/12* | (2006.01) |
| *C12Q 1/68* | (2018.01) |
| *C12Q 1/6886* | (2018.01) |

(52) U.S. Cl.
CPC .......... *A61K 31/785* (2013.01); *A61K 9/0012* (2013.01); *A61K 31/724* (2013.01); *A61K 31/80* (2013.01); *A61P 35/04* (2018.01); *C12Q 1/68* (2013.01); *C12Q 1/6886* (2013.01); *C08L 57/12* (2013.01); *C08L 2203/02* (2013.01); *C12Q 2600/158* (2013.01); *C12Q 2600/178* (2013.01)

(58) Field of Classification Search
CPC .... A61K 31/785; A61K 31/724; A61K 31/80; A61K 9/0012; A61P 35/04; C08L 57/12; C08L 2203/02; C12Q 1/68; C12Q 1/6886; C12Q 2600/158; C12Q 2600/178
See application file for complete search history.

(56) References Cited

U.S. PATENT DOCUMENTS

| | | |
|---|---|---|
| 5,276,088 A | 1/1994 | Yoshinaga |
| 5,608,015 A | 3/1997 | Yoshinaga |
| 5,855,900 A | 1/1999 | Nobuhiko |
| 6,509,323 B1 | 1/2003 | Davis et al. |
| 6,884,789 B2 | 4/2005 | Davis et al. |
| 7,018,609 B2 | 3/2006 | Hwang Pun et al. |
| 7,091,192 B1 | 8/2006 | Davis et al. |
| 7,166,302 B2 | 1/2007 | Hwang Pun et al. |
| 7,270,808 B2 | 9/2007 | Cheng et al. |
| 7,300,922 B2 | 11/2007 | Sullenger et al. |
| 7,304,041 B2 | 12/2007 | Rusconi |
| 7,566,701 B2 | 7/2009 | Diener et al. |
| 7,611,835 B2 | 11/2009 | Kim et al. |
| RE43,612 E | 8/2012 | Anderson et al. |
| 8,470,963 B2 | 6/2013 | Koltermann |
| 8,586,524 B2 | 11/2013 | Sullenger et al. |
| 9,340,591 B2 | 5/2016 | Sullenger et al. |
| 9,468,650 B2 | 10/2016 | Sullenger et al. |
| 2003/0083294 A1 | 5/2003 | Sullenger et al. |
| 2003/0143217 A1 | 7/2003 | Baird et al. |
| 2003/0180250 A1 | 9/2003 | Chauhan et al. |
| 2006/0040881 A1 | 2/2006 | Rusconi |
| 2008/0199485 A1 | 8/2008 | Kundig et al. |
| 2008/0267903 A1* | 10/2008 | Uchegbu .............. A61K 31/785 424/78.35 |
| 2009/0048193 A1 | 2/2009 | Rusconi et al. |
| 2009/0082250 A1 | 3/2009 | Hart et al. |

(Continued)

FOREIGN PATENT DOCUMENTS

| | | |
|---|---|---|
| WO | WO 2002/019822 | 3/2002 |
| WO | WO 2002/053185 | 7/2002 |

(Continued)

OTHER PUBLICATIONS

Korkeila (World Journal of Gastroenterology, Oct. 14, 2015, 21, 10709-10713). (Year: 2015).*
Wolfgang et al., Gastrointestinal Imaging Review, AJR:197, 2011 (Year: 2011).*
Sato, Cancer Microenvironment (2009) 2 (Suppl 1): S205-S214. (Year: 2009).*
Lee, PNAS, Aug. 23, 2011, vol. 108, No. 34, pp. 14055-14060. (Year: 2011).*
Bishop et al. (J Control Release. Dec. 10, 2015; 219: 488-499.). (Year: 2015).*

(Continued)

*Primary Examiner* — Jean P Cornet
(74) *Attorney, Agent, or Firm* — Quarles & Brady, LLP

(57) ABSTRACT

Methods of treating cancer in a subject by administering a therapeutically effective amount of a polycationic polymer to the subject are provided. Methods of treating cancer in a subject by contacting a bodily fluid from a subject with a polycationic polymer are also provided. Methods of detecting cancer or metastasis of cancer by obtaining a sample from a subject and determining the level of circulating free DNA (cfDNA), cfRNA, inorganic polyphosphates or the number of exosomes or nucleosomes in the sample are also provided.

10 Claims, 16 Drawing Sheets

(56) References Cited

U.S. PATENT DOCUMENTS

| | | | |
|---|---|---|---|
| 2009/0208501 | A1 | 8/2009 | Visintin et al. |
| 2009/0298710 | A1 | 12/2009 | Farokhzad et al. |
| 2010/0210746 | A1 | 8/2010 | Gustafson et al. |
| 2010/0249217 | A1 | 9/2010 | Sullenger et al. |
| 2010/0285081 | A1 | 11/2010 | Chen et al. |
| 2011/0118187 | A1 | 5/2011 | Sullenger et al. |
| 2012/0128782 | A1 | 5/2012 | Green et al. |
| 2012/0183564 | A1 | 7/2012 | Sullenger |
| 2013/0224740 | A1* | 8/2013 | Thierry ............... C12Q 1/6851 435/6.11 |
| 2013/0266664 | A1 | 10/2013 | Yang et al. |
| 2014/0231357 | A1 | 8/2014 | Ward et al. |
| 2015/0111849 | A1 | 4/2015 | McCrea et al. |
| 2017/0095503 | A1 | 4/2017 | Sullenger et al. |

FOREIGN PATENT DOCUMENTS

| | | | |
|---|---|---|---|
| WO | WO 2003/002592 | 1/2003 | |
| WO | WO 2006/040579 | 4/2006 | |
| WO | WO 2008/000517 | 1/2008 | |
| WO | WO 2008/063157 | 5/2008 | |
| WO | WO 2008/121354 | 10/2008 | |
| WO | WO 2010/020008 | 2/2010 | |
| WO | WO 2013/040552 | 3/2013 | |
| WO | WO 2014/169043 | 10/2014 | |
| WO | WO-2014193999 A2 * | 12/2014 | ........... C12N 15/111 |
| WO | WO 2015/161094 | 10/2015 | |

OTHER PUBLICATIONS

Marleau et al (Journal of Translational Medicine 2012, 10:134) (Year: 2012).*

Schattner (Fierce Biotech, Nov. 18, 2011) (Year: 2011).*

Brown et al (BBA—Reviews on Cancer, vol. 1869, Issue 2, Apr. 2018, pp. 303-309) (Year: 2018).*

Arakaki et al (Polymer Journal (2012) 44, 672-677) (Year: 2012).*

Lee et al (PNAS, Aug. 23, 2011, vol. 108, No. 34, pp. 14055-14060) (Year: 2011).*

Zambirinis et al (J Exp Med. Nov. 16, 2015;212(12):2077-2094) Epub Oct. 19, 2015 (Year: 2015).*

Oettle et al (JAMA. 2013;310(14):1473-1481) (Year: 2013).*

Costa-Silva et al (Nature Cell Biology vol. 17, No. 6, Jun. 2015) (Year: 2015).*

Givens et al (Photochem Photobiol. Jan.-Feb. 2008;84(1):185-192). (Year: 2008).*

Bompiani et al. "Probing the Coagulation Pathway with Aptamers Identifies Combinations that Synergistically Inhibit Blood Clot Formation" (2014) Chemistry & Biology 21: 935-944.

Catarino et al., "Quantification of free circulating tumor DNA as a diagnostic marker for breast cancer," (2008) DNA and cell biology 27(8):415-21.

Chase, et al., "Single-stranded DNA binding proteins required for DNA replication," (1986) Ann. Rev. Biochem. 55:103-136.

Costa-Silva et al., "Pancreatic cancer exosomes initiate pre-metastatic niche formation in the liver," (2015) Nature Cell Biology 17(6).

Demers et al., "Cancers predispose neutrophils to release extracellular DNA traps that contribute to cancer-associated thrombosis," (2012) Proceedings of the National Academy of Sciences 109(32).

Diaz et al., "Liquid Biopsies: Genotyping Circulating Tumor DNA," 2014 Journal of Clinical Oncology 32(6):579-86.

Gautschi et al., "Circulating deoxyribonucleic acid as prognostic marker in non-small-cell lung cancer patients undergoing chemotherapy," (2004) J Clin Oncol 22:4157-4164.

Goldmann et al., "The expanding world of extracellular traps: not only neutrophils but much more," (2013) Frontiers in Immunology.

Holdenrieder et al., "Clinical Relevance of Circulating Nucleosomes in Cancer," (2008) Annals of the New York Academy of Sciences 1137(1).

Holl, et al., "Nucleic acid scavenging polymers inhibit extracellular DNA-mediated innate immune activation without inhibiting antiviral responses," (2013) Plos One, 8(7):1-10.

Holl et al., "The nucleic acid scavenger polyamidoamine third-generation dendrimer inhibits fibroblast activation and granulation tissue contraction" (2014) Plast Reconstr Surg 134: 420e-33e.

Hoshino et al., "Tumour exosome integrins determine organotropic metastasis," (2015) Nature 527(7578):329-35.

Jain et al., "Platelets: linking hemostasis and cancer," (2010) Arteriosclerosis, thrombosis, and vascular biology 30(12):2362-7.

Jain et al., "Nucleic acid scavengers inhibit thrombosis without increasing bleeding," (2012) Proceedings of the National Academy of Sciences 109(32).

Janowska-Wieczorek et al., "Microvesicles derived from activated platelets induce metastasis and angiogenesis in lung cancer," (2005) International Journal of Cancer 113(5):752-60.

Janowska-Wieczorek et al., "Enhancing effect of platelet-derived microvesicles on the invasive potential of breast cancer cells," (2006) Transfusion 46(7):1199-209.

Jung et al., "Cell-free DNA in the blood as a solid tumor biomarker—a critical appraisal of the literature," (2010) Clinica chimica acta; international journal of clinical chemistry 411(21-22):1611-24.

Kang et al., "The HMGB1/RAGE inflammatory pathway promotes pancreatic tumor growth by regulating mitochondrial bioenergetics," (2013) Oncogene 33(5):567-77.

Kaplan et al., "Preparing the "soil": the premetastatic niche," (2006) Cancer research 66(23):11089-93.

Lee et al., "Nucleic acid-binding polymers as anti-inflammatory agents," (2011) Proc. Natl. Acd. Sci. 108(34):14055-60.

McIlroy et al., "Cell necrosis-independent sustained mitochondrial and nuclear DNA release following trauma surgery," (2015) Journal of Trauma and Acute Care Surgery 78(2).

Menck et al., "Induction and transport of Wnt 5a during macrophage-induced malignant invasion is mediated by two types of extracellular vesicles," (2013) Oncotarget 4(11):2057-66.

Menck et al., "Tumor-derived microvesicles mediate human breast cancer invasion through differentially glycosylated Emmprin," (2015) Journal of Molecular Cell Biology 7(2):143-53.

Merrell et al., "Toll-like receptor 9 agonists promote cellular invasion by increasing matrix metalloproteinase activity," (2006) Molecular cancer research : MCR 4(7):437-47.

Ochi et al., "Toll-like receptor 7 regulates pancreatic carcinogenesis in mice and humans," (2012) Journal of Clinical Investigation 122(11).

Pathak et al., "Circulating Cell-Free DNA in Plasma/Serum of Lung Cancer Patients as a Potential Screening and Prognostic Tool," (2006) Clinical Chemistry 52(10):1833-42.

Pisetsky, D.S. et al., "Nucleic acid-binding polymers as anti-inflammatory agents: reducing the danger of nuclear attack" (2012) Expert Rev Clin Immunol. 8(1):1-3.

Rakoff-Nahoum et al., "Toll-like receptors and cancer,"(2009) Nature reviews Cancer 9(1):57-63.

Ren et al., "Functional expression of TLR9 is associated to the metastatic potential of human lung cancer cell," (2007) Cancer Biology & Therapy 6(11).

Schwartz et al., "Phenylmethimazole Decreases Toll-Like Receptor 3 and Noncanonical Wnt5a Expression in Pancreatic Cancer and Melanoma Together with Tumor Cell Growth and Migration," (2009) Clinical Cancer Research 15(12):4114-22.

Schwarzenbach et al., "Cell-free nucleic acids as biomarkers in cancer patients," (2011) Nat Rev Cancer 11(6):426-37.

Stoetzer et al., "Prediction of response to neoadjuvant chemotherapy in breast cancer patients by circulating apoptotic biomarkers nucleosomes, DNAse, cytokeratin-18 fragments and survivin," (2013) Cancer letters 336(1):140-8.

Vaz et al., "Intervention on toll-like receptors in pancreatic cancer," (2014) World J Gastroenterol 20(19): 5808-5817.

Wen et al., "Extracellular DNA in Pancreatic Cancer Promotes Cell Invasion and Metastasis," (2013) Cancer Research 73(14).

Zitt et al., "Circulating cell-free DNA in plasma of locally advanced rectal cancer patients undergoing preoperative chemoradiation: a potential diagnostic tool for therapy," (2008) Disease markers.

(56) References Cited

OTHER PUBLICATIONS

International Search Report and Written Opinion for PCT/US2016/060496 dated Feb. 10, 201.
Restriction Requirement dated Dec. 21, 2018 for U.S. Appl. No. 15/773,933 (10 pages).

\* cited by examiner

Figure 2
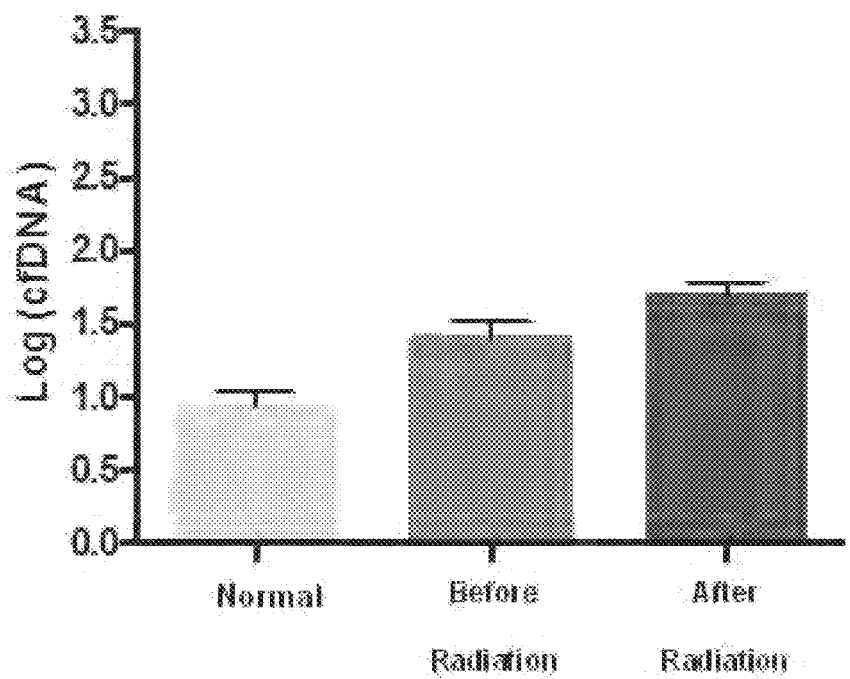
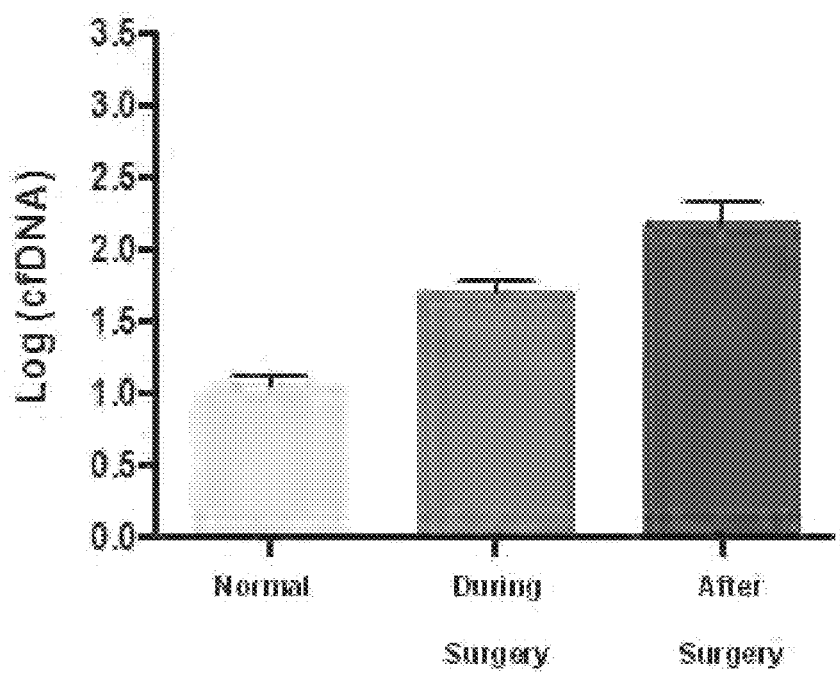

Figure 3
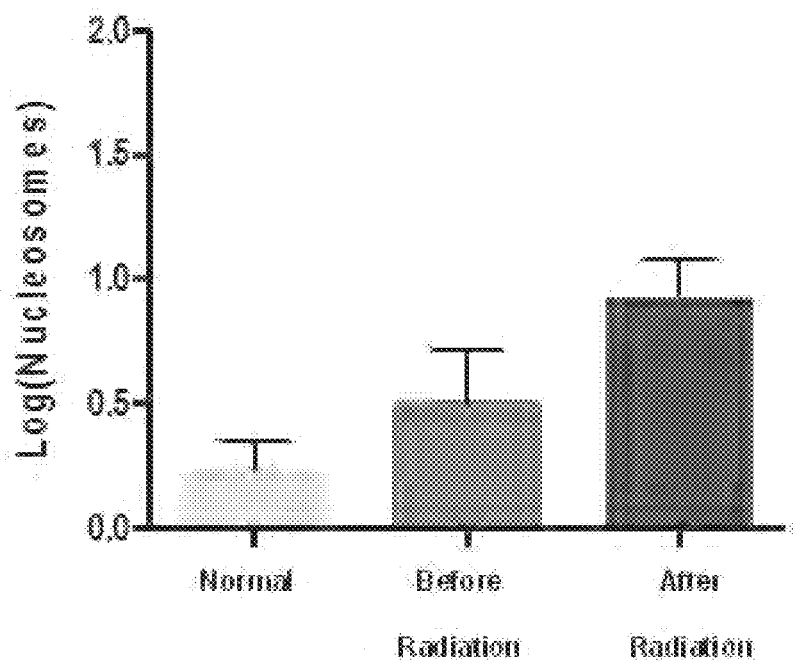
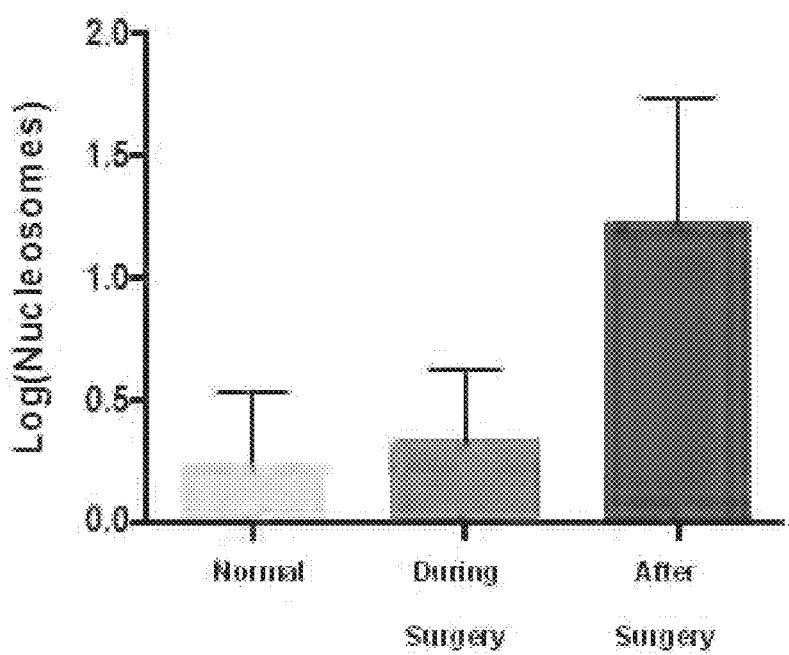

*** = p<0.001 by Kruskal-Wallis

** = p<0.01 by Kruskal-Wallis

Circulating DNA Levels in KPC Mice

Liver Flux vs Cell-Free DNA

Microparticle Induced Invasion Inhibited By PAMAM-G3

**** = p<0.0001 by t-test

MP Dose Dependent Invasion

| | Sample Name | Subset Name | Count |
|---|---|---|---|
| | MPs + G3.003 | live cells | 14323 |
| | MPs alone.002 | live cells | 15388 |
| | cells alone.001 | live cells | 16480 |

| Median Fluorescence Intensity | | | |
|---|---|---|---|
| | Median Exp 1 | Median Exp 2 | Median Exp 3 |
| Cells Along | 4.32 | 5.31 | 7.25 |
| Cells + MPs | 25 | 50.7 | 221 |
| Cells + MPs + G3 | 14.6 | 49.7 | 195 |

POLYCATIONIC POLYMERS FOR USE IN TREATING AND DETECTING CANCER

CROSS-REFERENCE TO RELATED APPLICATIONS

This patent application is a national stage filing under 35 U.S.C. 371 of International Application No. PCT/US2016/060496, filed Nov. 4, 2016, which claims the benefit of priority of U.S. Provisional Patent Application No. 62/385,586, filed Sep. 9, 2016; U.S. Provisional Application No. 62/301,034, filed Feb. 29, 2016, and U.S. Provisional Application No. 62/250,700, filed Nov. 4, 2015, all of which are incorporated herein by reference in their entirety.

STATEMENT REGARDING FEDERALLY SPONSORED RESEARCH

This invention was made with United States government support awarded by the National Institutes of Health grant numbers AI067798, AI093960, CA142903, T32GM007171 and F30HL127977. The United States has certain rights in this invention.

INTRODUCTION

Pancreatic cancer (PC) is the deadliest of the major cancers, with a 5-year survival rate of less than 5 percent. Despite numerous treatment strategies, PC is a devastating cancer with pronounced morbidity forcing researchers to carefully examine hallmarks of this destructive disease. The severity of this cancer is linked, in part, to endogenous molecules known as Damage Associated Molecular Patterns (DAMPs). Elevated levels of DAMPs have been found in patients with PC and are particularly elevated following canonical treatment regimens. The liberation of DAMPs is deleterious to the host in several ways including: enhanced malignancy, paraneoplastic sequela and thrombosis, enhanced inflammation and potentially undiscovered downstream effects. Considering the correlation between DAMPs and disease progression coupled with the paucity of effective treatment modalities, it is clear that alternative approaches are required to treat PC.

SUMMARY

Methods of treating cancer and detecting cancer in a subject are provided herein. The methods of treating cancer may include administering a therapeutically effective amount of a polycationic polymer to the subject. The polycationic polymer may be administered in conjunction with or after administration of a chemotherapeutic or surgical resection of the cancer.

In another aspect, methods of treating cancer in a subject by using a polycationic polymer to remove invasion-promoting or metastatic molecules or particles from a bodily fluid of the subject are also provided. A bodily fluid may be contacted or incubated with a polycationic polymer in vivo or ex vivo to remove the molecules or particles.

In yet another aspect, methods of detecting cancer are also provided. The methods include obtaining a sample from a subject and determining the level of a marker selected from circulating free DNA (cfDNA), circulating free RNA (cfRNA), exosomes, nucleosomes, or inorganic polyphosphate in the sample. If the level of the marker is increased as compared to the level in the normal population or in a control, the subject may have cancer. In some embodiments, a polycationic polymer may be administered to the subject prior to obtaining the sample or may be contacted with the sample when the sample is collected or obtained from the subject.

In a still further aspect, methods of detecting metastasis of a cancer are provided. The methods include obtaining more than one sample from a subject diagnosed with cancer over a period of time and determining the level of a marker selected from circulating free DNA (cfDNA), circulating free RNA (cfRNA), exosomes, nucleosomes, or inorganic polyphosphate in each of the samples. If the level of the marker in the samples increases over time it is indicative of metastasis or advancing cancer. In some embodiments, a polycationic polymer may be administered to the subject prior to obtaining the sample or may be contacted with the sample when the sample is collected or obtained from the subject. Individuals diagnosed with cancer or with an indication of advancing cancer or metastasis may be treated as described above with a therapy including a polycationic polymer.

BRIEF DESCRIPTION OF THE DRAWINGS

FIG. 2 is a set of graphs showing the increases in cfDNA in patient sera in response to standard therapies in pancreatic cancer such as chemo-radiation and surgical resection.

FIG. 3 is a set of graphs depicting increases in nucleosome levels in patient sera in response to standard therapies in pancreatic cancer such as chemo-radiation and surgical resection.

DETAILED DESCRIPTION

Pancreatic cancer (PC) is a devastating disease with high rates of mortality due to higher rates of metastatic disease. Currently, PC is the 12$^{th}$ most commonly diagnosed cancer in the US but is the fourth leading cause of cancer death. Five-year survival is less than 5%, the lowest of all major cancers and the global rate of mortality stands at a staggering 98%. Surgical resection of the primary tumor increases the survival rate to 20%, however, only 10-20% of patients diagnosed are eligible for surgery at the time of diagnosis (9). Progression of the primary tumor to metastatic disease remains the greatest hurdle to creating successful treatment modalities for this debilitating disease.

Figure 1:
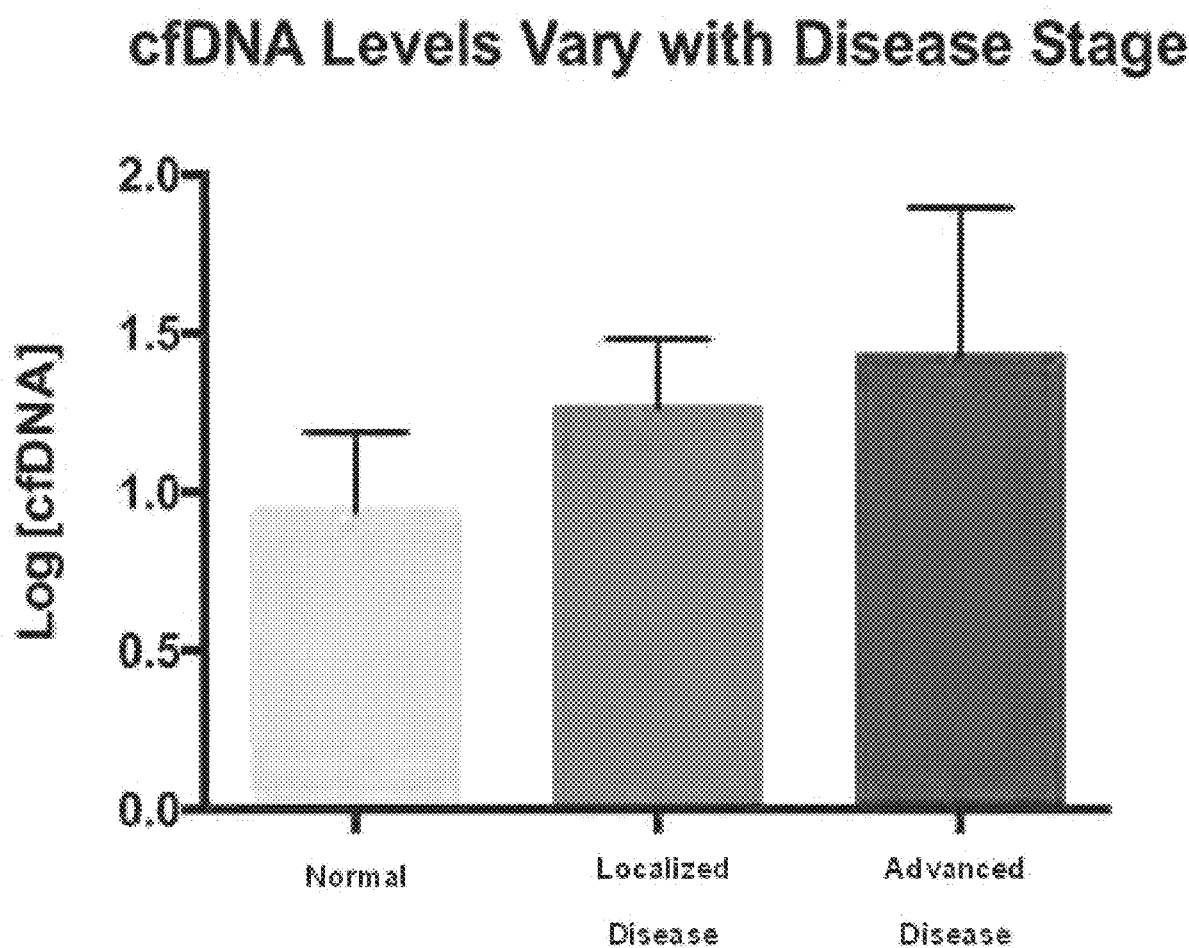
FIG. 1 is a graph depicting the elevated levels of cfDNA in pancreatic cancer patient sera as compared to normal volunteer sera.

Circulating cell-free DNA (cfDNA) and associated proteins such as nucleosomes and high mobility group box-1 (HMGB-1) have been associated with cancer disease burden and are shown to be elevated in a multitude of cancers (10). Many studies have suggested that cfDNA is a potential biomarker for cancer disease burden (11) as well as response to cancer therapy (12, 13). CfDNA and associated proteins are actively and passively released from a myriad of sources in cancer patients, including tumor as well as host cells. Sequencing-based studies have shown that cfDNA can originate from cancer cells and the copy numbers of signature genes such as oncogenic KRAS can vary in response to therapy (14, 15). Additionally, leukocytes such as neutrophils and eosinophils can release expansive DNA-protein complexes known as extracellular traps in response to inflammation and platelets can expel DNA during thrombosis (16, 17). Previous studies have shown that these host cells are predisposed to expelling nucleic acids in cancer patients (18, 19). As shown in FIG. 1, we have demonstrated that early stage PC patients have slightly elevated levels of cfDNA compared to healthy volunteers while patients with late stage or metastatic burden have still higher levels of cfDNA. cfRNA and inorganic polyphosphates are also released and current methods are not efficiently detecting these molecules. Capture with a polycationic polymer may allow for a more robust tracking of the levels of these markers in a subject and may more reliably detect cancer, or metastasis of a cancer.

CfDNA increases in response to standard therapy in PC. Recent work has shown that cfDNA can be used as a marker for response to therapy wherein total cfDNA tends to decrease as patients respond positively to therapy; chemotherapy in this case (15, 20). Additionally, other studies have also shown that cfDNA levels decrease in response to surgical resection of tumor (21, 22). In order to analyze the pattern of cfDNA and nucleosome release in our patient population, sera was collected from patients with early stage PC at four time-points: a baseline sample, 4-6 weeks after the end of preoperative chemoradiation, an intraoperative sample during surgery, and a post-operative sample one week after surgery. Interestingly, in contrast to some of the literature, we show that cfDNA and nucleosomes increase in response to neoadjuvant (preoperative) chemoradiation therapy in our PC patient population (FIGS. 2 and 3). Additionally, cfDNA and nucleosomes are increased in patients one week after surgery (FIGS. 2 and 3). Levels of cfDNA and nucleosomes in response to radiation therapy and surgery correlated fairly well. Interestingly, radiation induced a more modest increase in cfDNA and nucleosome levels whereas these markers were extremely elevated postoperatively (FIGS. 2 and 3). We expect detection of cfRNA will mirror and expand the cfDNA results reported herein.

CfDNA, cfRNA and associated proteins may promote metastasis. Although cfDNA and associated proteins have been studied extensively as markers of disease burden, more recent work has delved deeper into the potential active role that these circulating factors may have in tumor progression and metastasis. Recent studies in breast cancer, lung cancer, and pancreatic cancer have shown that the presence of cfDNA results in tumor cells that are more invasive and aggressive in vitro (23-25). More specifically, a study in PC found that tumor cell lines secreted and were associated with extracellular DNA whereas normal pancreatic cells were not (24). They also found that in vitro treatment of these cells with DNAse I reduced cell invasion, migration, and adhesion (24). This data culminated in their in vivo experiment wherein they implanted orthotopic xenograft pancreatic tumors into SCID mice and observed a reduction in tumor metastasis (24). Although extremely promising, this in vivo study is limited in that it ignores the immune component of tumor progression in a cancer that is known to be extremely inflammatory. This data, combined with the preliminary data generated from our PC patients bring credence to the idea that standard therapies meant to control disease burden in PC may be promoting tumor progression and metastasis.

Although the mechanisms by which cfDNA, cfRNA and associated proteins mediate tumor progression and metastasis are not clear, a possible explanation may be found in innate immune receptors. The toll-like receptors (TLRs) are sensors of the innate immune system that protect the host by detecting components of pathogens known as pathogen associated molecular patterns (PAMPs) (26). CfDNA is thought to exert its downstream effects via ligation with TLR-9, which is an evolutionarily specific sensor for unmethylated CpG (bacterial) DNA. However, TLR-9 is also ligated by endogenous forms of DNA that resemble bacterial DNA such as genomic DNA with CpG motifs and mitochondrial DNA (mtDNA). MtDNA evolutionarily resembles bacterial DNA and retains their pro-inflammatory properties (27, 28). RNA-sensing TLRs, TLR-3 and TLR-7, play a critical role in inflammation and may also play a role in PC progression (29, 30). In addition to cfDNA-mediated activation of TLR's, cfDNA associated proteins can activate TLR's 2 and 4 and TLR-associated receptors such as the Receptor for Advanced Glycation End products (RAGE) (31, 32). More specifically, nucleosomes and HMGB-1 have been shown to ligate TLR-4 and RAGE, both independently and in complex with each other and DNA, leading to NF-κB activation and subsequent downstream effects (33). Thus it seems that cfDNA and associated proteins can have diverse and potent downstream effects on tumor progression and metastasis via TLR and RAGE signaling axes.

We have previously evaluated nucleic acid binding polymers (NABPs), including protamine sulfate, cyclodextrin, and the highly branched polyamidoamine generation 3 (PAMAM-G3), and observed that NABPs could be used to reverse the anticoagulant activity of RNA oligonucleotide coagulation-factor inhibitors (aptamers) (34; International Publication No. WO2008/121354). Subsequently, our lab described that systemic administration of PAMAM-G3 could scavenge circulating, prothrombotic nucleic acids in a mouse model of carotid artery injury (34). Our lab has also shown that PAMAM-G3 can specifically block activation of TLR's in vitro and that systemic administration of PAMAM-G3 prolonged survival in a mouse model of acute liver failure induced by synthetic CpG (35; International Publication No. WO2011/034583). Moreover, our lab has also shown a therapeutic response using PAMAM-G3 in a mouse model of wound healing (36). Taken together, these data show that NABPs can block the pro-inflammatory downstream effects of cfDNA and cfRNA.

In addition to cfDNA, cfRNA and associated proteins, we show here that a cationic polymer (PAMAM-G3) is able to bind and neutralize tumor derived microparticles (MPs) and exosomes (EXOs). These tumor-derived lipid particles have recently been shown to be significant contributors to tumor progression and metastasis (37-45). MPs and EXOs have a diverse and multifaceted role in promoting tumor metastasis by acting on tumor cells directly as well as preconditioning the metastatic site for tumor implantation. Due to these recent developments, there has been a desire to screen for molecules that could potentially inhibit these deleterious downstream effects of MPs and EXOs. We discovered that PAMAM-G3 can bind these particles and neutralize their pro-invasive and pro-angiogenic effects in vitro. No one has shown the ability of a cationic polymer to bind to and neutralize MPs and EXOs.

Because of the collective evidence described above, we further explored the utility of a cationic polymer (PAMAM-G3) to inhibit metastasis in numerous in vitro assays and a bioluminescent murine model of pancreatic cancer liver metastasis. We have thus far observed significant reductions in pancreatic cancer cell invasion and migration in vitro and liver metastases in vivo.

As mentioned above, we show a correlation between DAMPs and cancer disease progression. This correlation can be used to screen for individuals with cancer or can be used to diagnose progression of the cancer once the initial diagnosis is made. Based on this information, we also set out to look for alternative means of controlling cancer by controlling DAMPs. DAMPs are known to activate innate immune receptors such as the toll-like receptors (TLRs). TLR's are typically expressed in myeloid cells that have the evolutionarily conserved task of either presenting these DAMPs to effector cells (dendritic cells, antigen presenting cells) or mounting a response to DAMP-mediated activation (macrophages, neutrophils). However, more recent studies have shown that cancers have co-opted TLR expression, especially TLR 4 and TLR9, utilizing downstream NF-κB signaling to promote expression of cell-death inhibitors and mediators of cell proliferation, invasion, and epithelial-mesenchymal transition. Thus, an approach geared toward blocking these co-opted pathways in cancer would be a potentially effective strategy. Of the DAMPs found in PC patients, cell free DNA (cfDNA) is one of the most studied in enhanced morbidity. Other extracellular nucleic acids such as cfRNA, microRNA, nucleic acid-protein complexes or other circulating particles may also be important to cancer progression.

In addition to DAMPs, tumor-derived microparticles (MPs) and exosomes (Exos) have also been implicated in tumor progression and metastasis. MPs have been shown to promote tumor cell invasion and migration in an autocrine and paracrine fashion via diverse intracellular signaling pathways (1, 2). Exosomes have been shown to pre-condition the metastatic site for tumor implantation (3-5). Targeting these factors has become a focus in the field more recently.

Our lab has previously demonstrated that both pro-inflammatory and pro-thrombotic nucleic acids can be scavenged by cationic polymers in several animal models (6-8). Cationic polymers were initially used as a tool for gene delivery, owing to their positively charged amine groups that can bind the negatively charged phosphate backbone of RNA and DNA. Here, we have also harnessed this property to evaluate these polymers as potential therapeutics against PC, demonstrating that a cationic polymer can scavenge inflammatory DAMPs in the setting of pancreatic cancer, and also bind and neutralize pro-invasive MPs and Exos. Thus, we present preliminary data suggesting that a cationic polymer may be a viable therapeutic for pancreatic cancer and in particular may inhibit metastatic invasion of the cancer.

Methods of treating cancer in a subject by administering a therapeutically effective amount of a polycationic polymer to the subject are provided herein. The polycationic polymer may be administered by any means known to those of skill in the art and may be administered in combination with other cancer therapeutic agents or in conjunction with or after surgical resection of the cancer. The polycationic polymer and cancer therapeutic agents may be combined in a single dosage form or may be administered in any order or concurrently via separate means. In the Examples the polycationic polymer was administered intraperitoneally, but intratumoral or intravenous administration are also acceptable routes of administration.

Methods of treating cancer in a subject using a polycationic polymer to remove invasion-promoting or metastatic molecules or particles from a bodily fluid of the subject are also provided. The invasion-promoting or metastatic molecules or particles include cell free DNA (cfDNA), cfRNA, microRNA, exosomes, microparticles or other particles such as nucleosomes or mitochondria, that may be inflammatory, may aid spread of the cancer cells to other locations or organs within the body or may be immunomodulatory to allow cancer cells to evade the immune response. The polycationic polymer may be immobilized on a substrate to allow for binding and removal of the invasion-promoting or metastatic molecules or particles from the body of the subject. Alternatively, the polycationic polymer may be made into electrospun nanofibers as described in International Publication Number WO/2015/161094. In one embodiment these molecules or particles may be found in a bodily fluid of the subject such as the blood or circulation of the subject and the polycationic polymer may inhibit the function of these or may bind to and allow removal of these molecules or particles from the bodily fluid. The bodily fluid may be selected from the blood, plasma, serum, cerebral spinal fluid, urine, saliva and lymph. The bodily fluid may be contacted with the polycationic polymer in vivo, such as on a surgical or other mesh or by soluble administration of the polycationic polymer to the subject. Alternatively, the bodily fluid may contact the polycationic polymer ex vivo, such as via a dialysis style procedure in which the subject's blood or sera from the patient is brought into contact with the polycationic polymer and then returned to the subject.

The polycationic polymer may be immobilized on a substrate. The bodily fluid may be brought into contact with the substrate. This contact may occur in vitro, in vivo or ex vivo. For in vivo contact the substrate may be placed near the tumor site or in a position within the body of the subject where the substrate and polycationic polymer are allowed to come into contact with bodily fluids. Alternatively, the bodily fluid may be carried from the body through an apparatus comprising the substrate to allow contact between the bodily fluid and the substrate similar to a dialysis machine. Finally the bodily fluid may be removed from the body, incubated for a period of time with the substrate and then returned to the subject. Those of skill in the art may envision other methods for contacting the bodily fluid with the substrate. The substrate may include a glass, silicon, a silicon polymer, a metal, a plastic, magnetic, or an electrospun fiber. Glasses may include silica, a borosilicate, or soda lime. Silicone polymers may include polydimethylsiloxane. Metals may include gold, silver, or platinum. Plastics may include a poly(methyl methacrylate), a poly(styrene), or cyclic olefin copolymer.

Contacting encompasses administration to a cell, tissue, mammal, patient, or human. Further, contacting a cell includes adding the polycationic polymer or substrate to a cell culture. Other suitable methods may include introducing or administering the polycationic polymer or substrate to a cell, tissue, mammal, or patient using appropriate procedures and routes of administration.

Treating cancer includes, but is not limited to, reducing the number of cancer cells or the size of a tumor in the subject, reducing progression of a cancer thereby making it a less aggressive form, reducing proliferation of cancer cells or reducing the speed of tumor growth, killing of cancer cells, reducing metastasis of cancer cells or reducing the likelihood of recurrence of a cancer in a subject. Treating a subject as used herein refers to any type of treatment that imparts a benefit to a subject afflicted with a disease or at risk of developing the disease, including improvement in the condition of the subject (e.g., in one or more symptoms), delay in the progression of the disease, delay the onset of symptoms or slow the progression of symptoms, etc.

The polycationic polymer is suitably a polycationic polymer capable of binding to a nucleic acid. Preferred polycationic polymers include biocompatible polymers (that is, polymers that do not cause significant undesired physiological reactions) that can be either biodegradable or non-biodegradable polymers or blends or copolymers thereof. PAMAM G3 was used in the examples, but other polycationic polymers are anticipated to achieve similar effects. Examples of such polymers include, but are not limited to, polycationic biodegradable polyphosphoramidates, polyamines having amine groups on either the polymer backbone or the polymer side chains, nonpeptide polyamines such as poly(aminostyrene), poly(aminoacrylate), poly(N-methyl aminoacrylate), poly(N-ethylaminoacrylate), poly(N,N-dimethyl aminoacrylate), poly(N,N-diethylaminoacrylate), poly(aminomethacrylate), poly(N-methyl amino-methacrylate), poly(N-ethyl aminomethacrylate), poly(N,N-dimethyl aminomethacrylate), poly(N,N-diethyl aminomethacrylate), poly(ethyleneimine), polymers of quaternary amines, such as poly(N,N,N-trimethylaminoacrylate chloride), poly(methyacrylamidopropyltrimethyl ammonium chloride); natural or synthetic polysaccharides such as chitosan, cyclodextrin-containing polymers, degradable polycations such as poly[alpha-(4-aminobutyl)-L-glycolic acid] (PAGA); polycationic polyurethanes, polyethers, polyesters, polyamides, polybrene, etc. Particularly preferred cationic polymers include CDP, CDP-Im, PPA-DPA, PAMAM and HDMBr. (See U.S. Pat. Nos. 9,340,591, 7,270,808, 7,166, 302, 7,091,192, 7,018,609, 6,884,789, 6,509,323, 5,608,015, 5,276,088, 5,855,900, U.S. Published Appln. Nos. 2012/ 0183564, 20060263435, 20050256071, 200550136430, 20040109888, 20040063654, 20030157030, International Patent Publication No. WO 2014/169043, Davis et al, Current Med. Chem. 11(2) 179-197 (2004), and Comprehensive Supramolecular Chemistry vol. 3, J. L. Atwood et al, eds, Pergamon Press (1996).)

The polycationic polymer may also be labeled either directly via a covalent bond to the polycationic polymer or indirectly through a crosslinker or other non-covalent interaction. The label may allow binding of the polycationic polymer to other molecules or substrates useful in the methods described herein. For example the polycationic polymer may include a biotin label. Alternatively the polycationic polymer may include another form of detectable label such as a chromophore. The chromophore may be a fluorophore such as an Alexa based fluorophore. Methods of linking a binding agent or detectable label to a polycationic polymer are provided in the provisional applications and the co-filed international patent application. The crosslinker may be used to attach the polycationic polymer to a substrate such as a surgical mesh, filter or to nano- or microfiber meshes to allow the bodily fluid to contact the polycationic polymer and then be removed from the patient or allow the bodily fluid to be returned to the subject without administering the polycationic polymer to the subject.

The cancer being treated is suitably a cancer prone to metastasis. The cancer may be selected from the group consisting of pancreatic, ovarian, colon, liver, brain, breast, prostate, bladder, melanoma, head, neck and lung cancers. Administration of PAMAM was able to reduce the mortality of pancreatic cancer in mice in the Examples. In particular this reduction in mortality was associated with a decrease in liver invasion of the tumor cells. In one embodiment the metastatic growth of the cancer is inhibited by administration of a polycationic polymer. Without being limited by theory the polycationic polymer may be blocking invasiveness of the cancer cells by binding cfDNA, binding microparticles or binding exosomes and blocking the activity of these particles or molecules in promoting invasiveness of the cancer cells.

The polycationic polymer may be used to make pharmaceutical compositions. Pharmaceutical compositions comprising the polycationic polymers described above and a pharmaceutically acceptable carrier are provided. A pharmaceutically acceptable carrier is any carrier suitable for in vivo administration. Examples of pharmaceutically acceptable carriers suitable for use in the composition include, but are not limited to, water, buffered solutions, glucose solutions, or oil-based carriers. Additional components of the compositions may suitably include, for example, excipients such as stabilizers, preservatives, diluents, emulsifiers and lubricants. Examples of pharmaceutically acceptable carriers or diluents include stabilizers such as carbohydrates (e.g., sorbitol, mannitol, starch, sucrose, glucose, dextran), proteins such as albumin or casein, protein-containing agents such as bovine serum or skimmed milk and buffers (e.g., phosphate buffer). Especially when such stabilizers are added to the compositions, the composition is suitable for freeze-drying or spray-drying. The composition may also be emulsified.

The polycationic polymer may be administered with a cancer therapeutic or radiation. The polycationic polymer and cancer therapeutics may be administered in any order, at the same time or as part of a unitary composition. The two may be administered such that one is administered before the other with a difference in administration time of 1 hour, 2 hours, 4 hours, 8 hours, 12 hours, 16 hours, 20 hours, 1 day, 2 days, 4 days, 7 days, 2 weeks, 4 weeks or more. The polycationic polymer may be administered or used to contact a bodily fluid of the subject in conjunction with or after surgery to remove at least a portion of the cancer, such as tumor resection or tumor biopsy. Any cancer therapeutic known to those of skill in the art may be used in combination with the polycationic polymers. Suitable cancer therapeutics include, but are not limited to 5-fluorouracil, gemcitabine, cisplatin, capecitabine, paclitaxel, irinotecan, oxaliplatin, docetaxel, and erlotinib.

An effective amount or a therapeutically effective amount as used herein means the amount of the polycationic polymer that, when administered to a subject for treating cancer is sufficient to effect a treatment (as defined above). The therapeutically effective amount will vary depending on the compositions or formulations, the disease and its severity and the age, weight, physical condition and responsiveness of the subject to be treated.

The compositions described herein may be administered by any means known to those skilled in the art, including, but not limited to, oral, topical, intranasal, intraperitoneal, parenteral, intravenous, intramuscular, subcutaneous, intrathecal, transcutaneous, nasopharyngeal, intratumoral, intrathecal, or transmucosal absorption. Thus the compounds may be formulated as an ingestable, injectable, topical or suppository formulation. The compositions may also be delivered within a liposomal or time-release vehicle. Administration to a subject in accordance with the invention appears to exhibit beneficial effects in a dose-dependent manner. Thus, within broad limits, administration of larger quantities of the compositions is expected to achieve increased beneficial biological effects than administration of a smaller amount. Moreover, efficacy is also contemplated at dosages below the level at which toxicity is seen.

It will be appreciated that the specific dosage administered in any given case will be adjusted in accordance with the compositions being administered, the disease to be treated or inhibited, the condition of the subject, and other relevant medical factors that may modify the activity of the compound or the response of the subject, as is well known by those skilled in the art. For example, the specific dose for a particular subject depends on age, body weight, general state of health, diet, the timing and mode of administration, the rate of excretion, medicaments used in combination and the severity of the particular disorder to which the therapy is applied. Dosages for a given patient can be determined using conventional considerations, e.g., by customary comparison of the differential activities of the compound of the invention and of a known agent such as tocopherol, such as by means of an appropriate conventional pharmacological or prophylactic protocol. The subject may be a human subject, a human suffering from cancer or a non-human animal subject. For example, the subject may be a domesticated animal such as a cow, pig, chicken, horse, goat, sheep, dog or cat.

The maximal dosage for a subject is the highest dosage that does not cause undesirable or intolerable side effects. The number of variables in regard to an individual prophylactic or treatment regimen is large, and a considerable range of doses is expected. The route of administration will also impact the dosage requirements. It is anticipated that dosages of the compositions will reduce symptoms of the condition at least 10%, 20%, 30%, 40%, 50%, 60%, 70%, 80%, 90% or 100% compared to pre-treatment symptoms or symptoms is left untreated. It is specifically contemplated that pharmaceutical preparations and compositions may palliate or alleviate symptoms of the disease without providing a cure, or, in some embodiments, may be used to cure the disease or disorder.

Suitable effective dosage amounts for administering the compositions may be determined by those of skill in the art, but typically range from about 1 microgram to about 500 milligrams per kilogram of body weight weekly, although they are typically about 50,000 micrograms or less per kilogram of body weight weekly. Large doses may be required for therapeutic effect and toxicity of the compositions is likely low. In some embodiments, the effective dosage amount ranges from about 10 to about 50,000 micrograms per kilogram of body weight weekly. In another embodiment, the effective dosage amount ranges from about 100 to about 25,000 micrograms per kilogram of body weight weekly. In another embodiment, the effective dosage amount ranges from about 1000 to about 20,000 micrograms per kilogram of body weight weekly. The effective dosage amounts described herein refer to total amounts administered, that is, if more than one compound is administered, the effective dosage amounts correspond to the total amount administered. The compositions can be administered as a single dose or as divided doses. For example, the composition may be administered two or more times separated by 4 hours, 6 hours, 8 hours, 12 hours, a day, two days, three days, four days, one week, two weeks, or by three or more weeks.

Methods of detecting cancer or detecting metastasis of cancer are also provided herein. The methods of detecting cancer include obtaining a sample from a subject and determining a level of circulating free DNA (cfDNA), cfRNA, inorganic polyphosphates, exosomes or nucleosomes in the sample. An increase in the level or number of any of these markers in the subject as compared to the level of the corresponding marker in a control subject without cancer is indicative of cancer in the subject. The control may be an individual without cancer or may be a sample obtained from the subject being tested at a point when they were cancer free. For example, a subject may routinely be screened for the level or number of these markers present in their serum each year at an annual physical. The subject's normal levels of these markers in the serum then can become their own control level and increased levels may be detected relative to the same subject. Alternatively a standard level may be generated such that a subject is compared to a standard control level or number of the markers found in a healthy (non-cancer) set of individuals. When the level of cfDNA, cfRNA, inorganic polyphosphates, exosomes or nucleosomes is increased 20%, 25%, 30%, 35%, 40%, 45%, 50%, 55%, 60%, 70%, 75%, 80%, 90%, or more than 100% compared to the control, the subject may be diagnosed as having a high likelihood of having cancer and can then be subjected to further more invasive or more expensive testing to determine the type and location of the cancer. The number of nucleosomes may be indicative of cancer if the number increases 0.25 log, 0.5 log, 0.75 or 1 log as compared to the control.

Methods of detecting metastasis or recurrence of a cancer in a subject may include obtaining more than one sample from a subject diagnosed with cancer over a period of time. The period of time may extend from the point of diagnosis of the cancer throughout treatment and may extend beyond treatment of the cancer. For example, samples may be collected and analyzed prior to diagnosis of the cancer, at or shortly after diagnosis of the cancer, intermittently during treatment of the cancer, during or after surgery to remove the cancer, after treatment is completed and at intermittent points thereafter to monitor for recurrence. The level of circulating free DNA (cfDNA), cfRNA, inorganic polyphosphates, exosomes or number of nucleosomes in each of the samples is determined and compared over time in the samples. If the level of any of these markers in the samples increases over time, it is indicative of metastasis or advancing cancer. In each of these methods, if cancer is detected or metastasis is determined to be likely based on increased levels or numbers of any of the markers, then a polycationic polymer may be administered to the subject as described above. The samples for use in these methods of detecting cancer or metastasis may be any bodily fluid including but not limited to blood, serum, plasma, saliva, cerebral spinal fluid and urine samples. In one embodiment of these methods of detecting cancer or metastasis, the polycationic polymer is administered to the subject prior to obtaining the sample or is added to the sample when collected form the subject. By administering a polycationic polymer or contacting the sample with the polycationic polymer, we can protect cfDNA from degradation during isolation and characterization as well as expand the analysis to cfRNA and inorganic polyphosphates using this protection approach. This may offer more sensitive detection of these markers in a subject and be useful for increasing the sensitivity and specificity of such methods.

The present disclosure is not limited to the specific details of construction, arrangement of components, or method steps set forth herein. The compositions and methods disclosed herein are capable of being made, practiced, used, carried out and/or formed in various ways that will be apparent to one of skill in the art in light of the disclosure that follows. The phraseology and terminology used herein is for the purpose of description only and should not be regarded as limiting to the scope of the claims. Ordinal indicators, such as first, second, and third, as used in the description and the claims to refer to various structures or method steps, are not meant to be construed to indicate any specific structures or steps, or any particular order or configuration to such structures or steps. All methods described herein can be performed in any suitable order unless otherwise indicated herein or otherwise clearly contradicted by context. The use of any and all examples, or exemplary language (e.g., "such as") provided herein, is intended merely to facilitate the disclosure and does not imply any limitation on the scope of the disclosure unless otherwise claimed. No language in the specification, and no structures shown in the drawings, should be construed as indicating that any non-claimed element is essential to the practice of the disclosed subject matter. The use herein of the terms "including," "comprising," or "having," and variations thereof, is meant to encompass the elements listed thereafter and equivalents thereof, as well as additional elements. Embodiments recited as "including," "comprising," or "having" certain elements are also contemplated as "consisting essentially of" and "consisting of" those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure. Use of the word "about" to describe a particular recited amount or range of amounts is meant to indicate that values very near to the recited amount are included in that amount, such as values that could or naturally would be accounted for due to manufacturing tolerances, instrument and human error in forming measurements, and the like. All percentages referring to amounts are by weight unless indicated otherwise.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

The following examples are meant only to be illustrative and are not meant as limitations on the scope of the invention or of the appended claims.

EXAMPLES

Example 1

Cationic Polymer Inhibits TLR Activation by PC Patient Sera In Vitro

Method: Blood was collected from patients with pancreatic cancer during various stages of their disease course, including localized disease, before, during and after chemoradiation therapy, intra-operative samples, and progressive disease including metastasis. Blood was collected into serum collection tubes wherein coagulation was activated and the sample was spun at 1500 rpm for 5 min. The supernatant was collected and aliquoted as patient sera for use. Cell-free DNA and nucleosome levels were then quantified in these patient sera with normal, healthy volunteer sera used as a control. Cell-free DNA was quantified by first isolating cell-free DNA from the sera using Qiagen's Blood Mini Kit strictly adhering to the manufacturer's instructions. This isolated DNA was then diluted 1 to 4 and then quantified via fluorescent Picogreen stain, strictly adhering to the manufacturer's instructions. Total nucleosomes were quantified using Roche's Cell Death Detection ELISA, strictly adhering to the manufacturer's instructions. HEK-TLR 3, 4, 7, 9 reporter cell lines were purchased from Invivogen. These cells were grown and passaged in congruence with the manufacturer's instructions. These cells were plated in 96-well, clear-bottom, flat-bottom plates. Cells were plated at 100,000 cells per well with at least 5 wells per condition. These cells were then treated for 18-24 hours with either 1) media alone, 2) a control agonist for each given TLR (poly I:C for 3, LPS for 4, R848 for 7, and CpG ODN for 9), 3) cancer patient sera, 4) normal volunteer sera, 5) control agonist+PAMAM-G3, 6) media alone+ PAMAM-G3, 7) cancer patient sera+PAMAM-G3, 8) normal patient sera+PAMAM-G3. After this incubation period, the supernatant was collected from the cells and mixed with a proprietary compound (Quantiblue) from Invivogen at a 60:40 vol:vol mixture and incubated for 5 hours at 37° C. in a 96 well plate. The plate was read at 650 nm in an absorbance plate reader. Data was quantified and analyzed using GraphPad Prism software.

Figure 4:
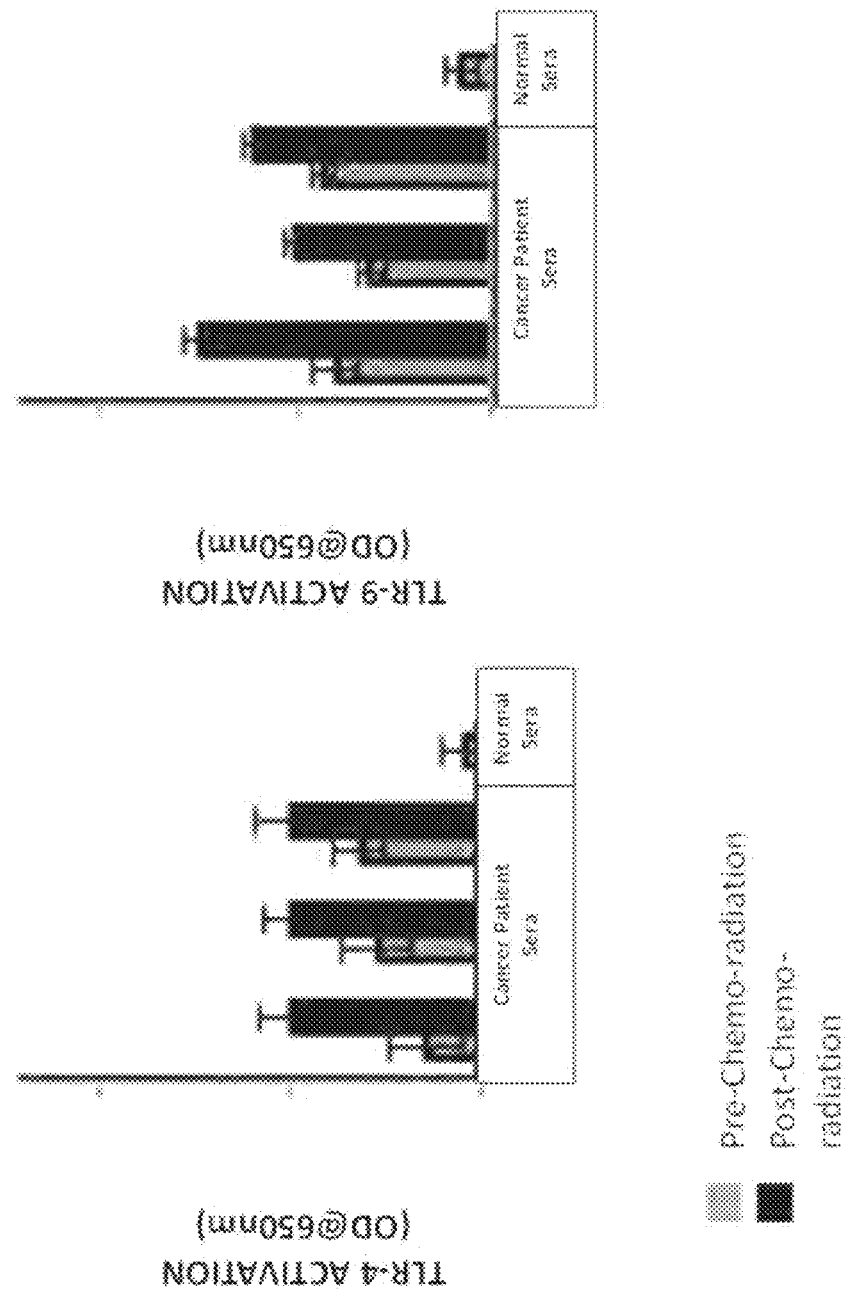
FIG. 4 is a set of graphs depicting TLR 4 and TLR9 activation by pancreatic cancer patient sera and the lack of activation by normal patient sera.
Figure 5:
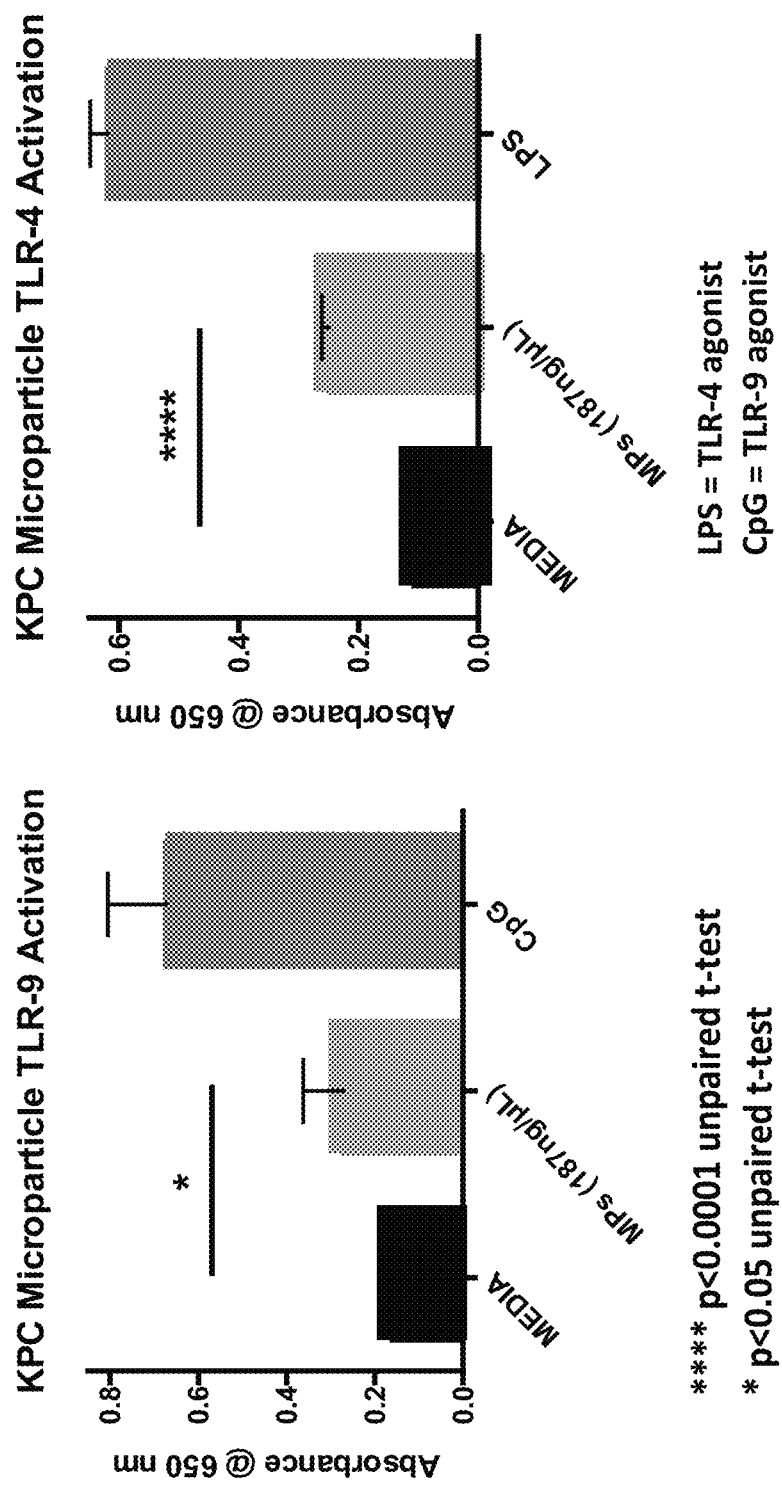
FIG. 5 is a set of graphs showing that pancreatic cancer derived MPs activate TLRs.
Figure 6:
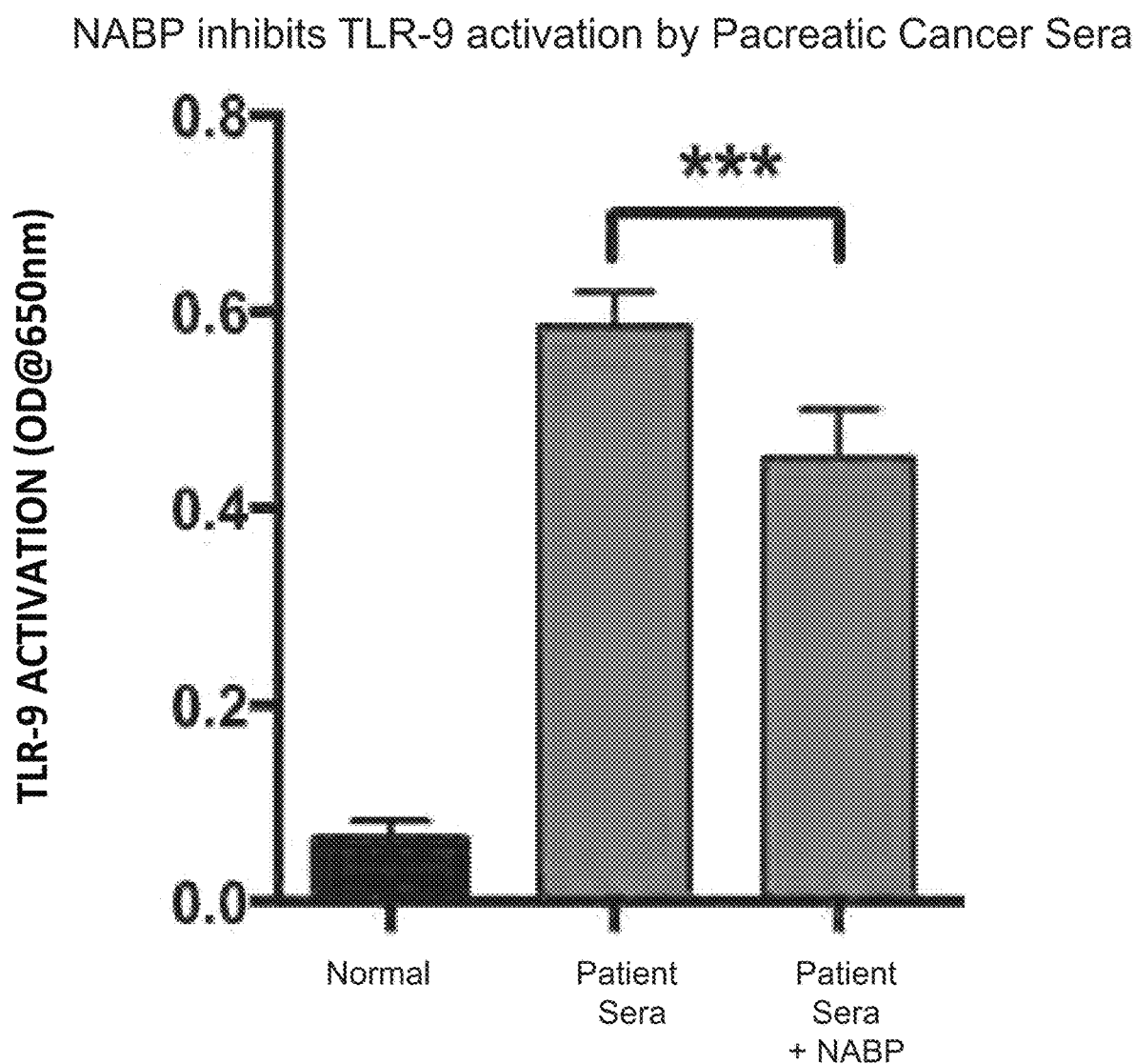
FIG. 6 is a graph showing that nucleic acid binding polymers such as PAMAM G3 decrease activation of TLR9 by sera from pancreatic cancer patients.

Result: Sera from PC patients had elevated levels of cfDNA which further correlated positively with disease burden (FIG. 1). Both cfDNA and nucleosome levels increased in patient sera after radiation therapy and surgical resection (FIG. 2 and FIG. 3). Sera from PC patients promoted significant activation of TLR 4 and 9. See FIG. 4. FIG. 5 shows that pancreatic cancer derived MPs activate TLR4 and TLR9. In addition, PAMAM-G3 treatment led to a significant reduction in TLR stimulation induced by the PC patient sera. See FIG. 6.

Example 2

Cationic Polymer Inhibits TLR9 Agonist Induced Pancreatic Cancer Cell Invasion In Vitro Method: Transwell-Matrigel invasion chambers were purchased from Corning. The invasion chambers were first plated with serum-free media in the top and bottom chambers at 37° C. for a minimum of 1.5 hours to allow the Matrigel to solidify and the two chambers to equilibrate in preparation for the addition of cells and TLR agonists. After this time, human (BxPC3, MiaPaca2, PANC-1, AsPC-1) or mouse (KPC-4580P) pancreatic cancer cell lines were displaced from their flasks using 3 mLs of 0.25% trypsin (Life Sciences) for 3-5 min at 37° C. The cells were then lifted using a complete media wash and spun down at 200 g for 3-5 min. The supernatant was removed and the cells were resuspended in 3-5 mL of serum-free media. Cells were counted using a 1:1 dilution in trypan blue and injection of this solution into a cellometer cell counting strip. The strip was then placed into an automated cellometer and cells were counted using cell-line specific counting parameters. Cells were diluted to 125,000 cells per mL. 800 μl it of the diluted cell suspension was loaded into an Eppendorf tube individually preloaded with the following agonists for a total volume of 1000 μL: 1) serum free media alone; 2) serum free media+CpG ODN @ 4 μM; 3) serum free media+CpG ODN @ 4 μM+PAMAM-G3 @ 20 μg/mL; 4) serum free media+PAMAM-G3. Each tube was then mixed thoroughly by pipetting up and down.

The invasion chambers were removed from the incubators and the media was aspirated from both the top and bottom chambers. 750 μL of complete media was then added to the bottom chambers and 500 μL of each cell mixture was added to the top of the two chambers, for a duplicate of each condition. The plated invasion chambers were then incubated at 37° C. and 5% $CO_2$ for 24 hours. At this point the chambers were removed from the incubator and media was aspirated from both the top and bottom chambers. The top chambers were then removed and placed into a new 24-well plate with the bottom chambers pre-loaded with 1 mL of 10% formaldehyde per well. The membrane of the top chamber was fixed in the formaldehyde for 10 minutes. The top chambers were then removed from the fixative and placed into a new 24-well plate preloaded with 1 mL of PBS (−/−) per well. The membranes of the top chamber were kept in PBS for 1 minute for washing purposes. The top chambers were then placed onto absorbent pads and residual PBS was wiped from the inside of the top chambers using a cotton swab. The top chambers were then placed upside down with the membranes facing upward onto the absorbent pads. 10 μL it of crystal violet solution were then dropped onto the membranes and allowed to stain for 5 min. The chambers were then washed in DI water and residual crystal violet was wiped from the inside of the chambers using a cotton swab. The membranes were then imaged using an inverted light microscope at 40× magnification. 12 random images of each membrane were taken using an eyepiece camera. The cells in the images were then counted using an ImageJ algorithm unique for each cell line. The cell count numbers were then statistically analyzed via GraphPad Prism software.

Figure 7:
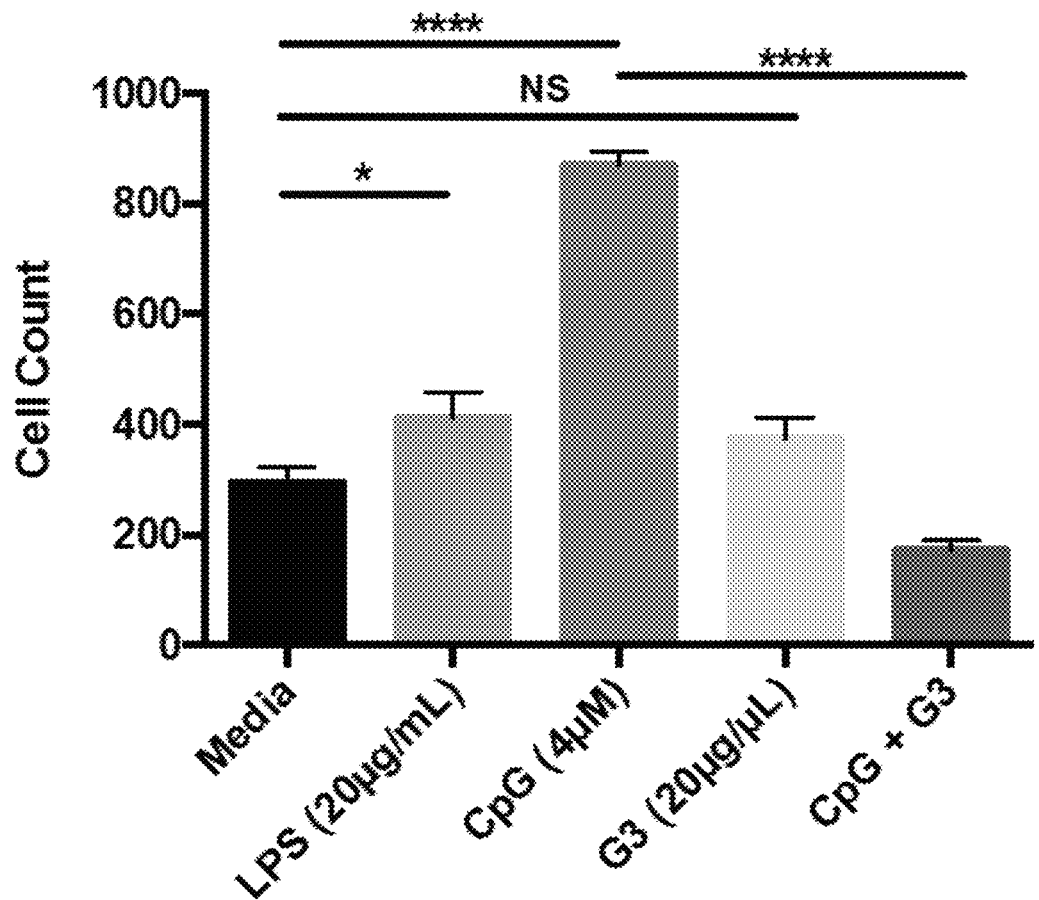
FIG. 7 is a graph showing the ability of PAMAM to block KPC pancreatic cancer cell invasion after activation by a TLR9 agonist.
Figure 8:
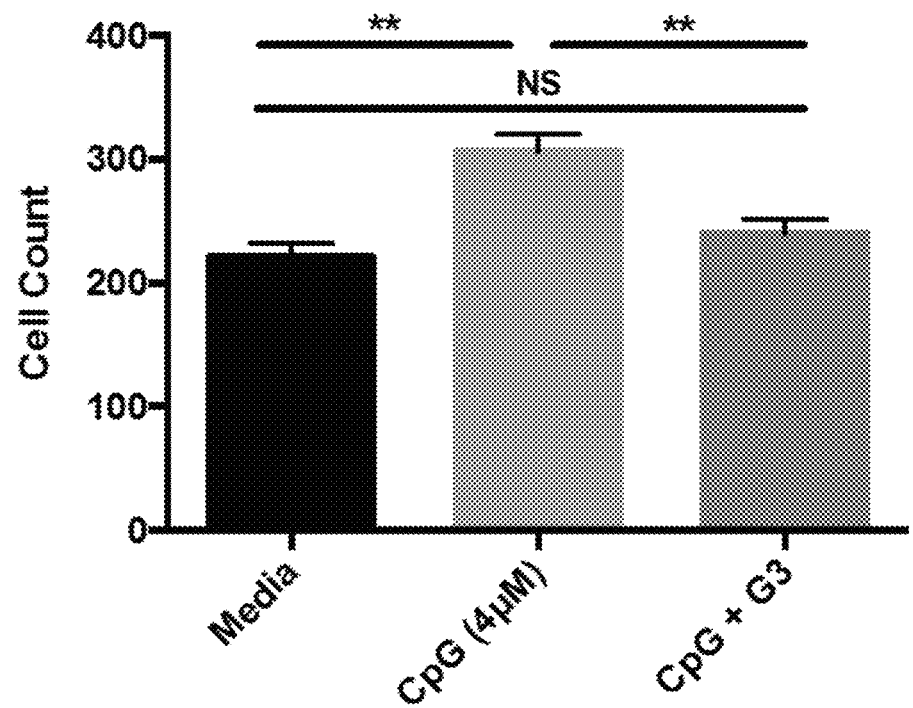
FIG. 8 is a graph showing the ability of PAMAM to block BxPC3 pancreatic cancer cell invasion after activation by a TLR9 agonist.

Result: TLR-9 agonists (CpG) induced invasion in all pancreatic cancer cell lines tested and PAMAM-G3 was able to abrogate this invasive effect as shown in FIG. 7 for KPC cells and FIG. 8 for the BxPC3 cells.

Example 3

Cationic Polymers Inhibit Metastasis In Vivo and Prolong Survival After Primary Tumor Resection:

Method: Briefly, KPC 4580P luciferase expressing, murine pancreatic cancer cells (gift of Jen Jen Yeh, UNC) were injected into the spleens of C57/B6 mice. Starting on Day 2 after tumor cell implantation, these mice were treated twice per week with either intraperitoneal PAMAM-G3 (20 mg/kg) or saline for 3.5 weeks, at which time the mice were sacrificed. Liver and spleen were harvested from each mouse for gross organ weight and ex vivo quantification of bioluminescent intensity (IVIS Kinetic). Just prior to sacrifice, caudal vena cava blood was collected from each mouse for analysis of plasma cfDNA levels using Picogreen staining (Invitrogen). This assay was performed by first isolating total DNA from serum using Qiagen's DNA Blood Mini Kit according to the manufacturer's protocol. Once the DNA was isolated, the DNA was mixed with the fluorescent Picogreen stain and quantified via fluorescent plate reader using Life Technologies provided protocol.

For tumor cell implantation and animal imaging, KPC 4580P cells were cultured to confluence in a T-75 corning flask with DMEM-F12+10% FBS+1% Pen/Strep. The cells were washed 3X with sterile PBS and resuspended in 1:1 (vol/vol) media:Matrigel for a total injection volume of 50 μL ($10^5$ cells/mouse). Using sterile microscissors, a 1.5-cm longitudinal incision was made in the skin, 1-cm left, lateral of midline, slightly medial to the spleen. Next a 1.5-cm incision was made in the abdominal musculature, mirroring the overlying superficial incision. Next, the spleen was located using forceps and gently removed from the abdominal cavity. The cell suspension was aspirated into a syringe and capped with a 27-30G needle and kept on ice prior to the surgery. Cells were carefully injected into the spleen. Once the cells were injected, the needle was kept in the spleen for 60 seconds so that the Matrigel solidified; this ensured that the cells did not leak into the abdominal cavity. The needle was removed and the spleen was kept external for an additional 60 seconds while inspecting for any signs of hemorrhage or leak. The spleen was gently internalized using blunt tipped forceps. The abdominal musculature was closed using a 3-0 to 6-0 absorbable suture with either a continuous or interrupted stitch. Prior to skin closure, the mouse was dosed with 2 mg/kg bupivacaine via syringe between the abdominal and cutaneous layers to ensure proper analgesia. The overlying skin was closed using a 3-0 to 6-0 nonabsorbable suture with either a continuous or interrupted stitch. At this point the mouse was removed from the inhaled anesthetic. The mouse was allowed to recover in its cage with free access to food and water. If the mouse displayed any signs of pain such as haunching, the mouse was provided with subcutaneous buprenorphine every 12 hours as needed. In 7-10 days, once the surgical wound healed, the mouse was anesthetized and the skin sutures were removed. Starting on Day 2 after tumor cell implantation, these mice were treated twice per week with either intraperitoneal PAMAM-G3 (20 mg/kg) or saline for 3.5 weeks or until humane endpoints were reached.

In order to track the growth/metastases of the implanted tumors, mice were imaged using a standard bioluminescent imaging methodology. Approximately 24 hours before imaging, hair was removed from the ventral abdomen of the study animals, if necessary. Anesthesia was induced with 3 to 5% isoflurane inhaled in a sealed chamber 3-5 minutes or until effect. After induction, mice were placed in dorsal recumbency on a heating pad and anesthesia was maintained with 1-3% isoflurane delivered by a nose cone. Lubricant was applied to the eyes to prevent dessication. Hair was removed from the ventral abdomen using depilatory cream and cleaned with gauze. The mouse was allowed to recover alone in a cage under observation until able to exhibit a righting reflex. The mouse was then returned to its home cage. Approximately 24 hours after hair removal, anesthesia was again induced with 3 to 5% isoflurane inhaled in a sealed chamber 3-5 minutes or until effect. After gas induction a single injection of imaging agent, D-Luciferin (15-20 mg/mL), was given IP with 26-27 g ½" needle at a dose of 120 mg/kg with PBS vehicle. Lubricant was applied to the eyes to prevent dessication. The mouse was placed in the bioluminescent imaging system and anesthesia was maintained with 1-3% isoflurane delivered by a nose cone. The mouse was placed in the bioluminescent imaging system and white/bioluminescence images were captured over approximately 10 minutes.

This process was repeated every week until 3.5 weeks after tumor implantation. At this point the mice were imaged using the above procedure however the mice were sacrificed after imaging, blood was collected via the inferior vena cava and the spleen and liver were imaged ex vivo using the IVIS Kinetic imager.

In a subsequent survival study, the primary tumors of all mice were surgically resected at 18 days after tumor implantation. After ensuring a surgical plane of anesthesia by lack of pedal reflex to a toe pinch, a 1.5-cm longitudinal incision was made with microsurgical scissors in the skin 1 cm left-lateral of midline, slightly medial to the spleen. Next, a 1.5 cm incision was made in the abdominal musculature, mirroring the overlying superficial incision. The spleen was located using forceps and gently retracted from the abdominal cavity using a sterile cotton tipped applicator. The splenic hilum was visualized with care taken to localize the splenic vessels. Once the vasculature was localized, the vessels were ligated with either 4-0 suture that is looped through the mesentery and tied with a single knot placed right at the splenic hilum OR vascular clips that was placed close to the hilum. The mesentery and connective tissue was resected with care taken to minimize bleeding. The spleen was carefully removed and the surgical site inspected for signs of bleeding. Once hemostasis was ensured, the abdominal musculature was closed using a 3-0 to 6-0 absorbable suture with either a continuous or interrupted pattern. Prior to skin closure, and with the help of an assistant, 0.25% bupivicaine (diluted to 0.125% with sterile saline) was dripped between the abdominal and cutaneous layers at no more than a maximum dose of 2 mg/kg, approximately 15-40 µL. The overlying skin was closed using a 3-0 to 6-0 nonabsorbable suture with either a continuous or interrupted pattern. The mouse was allowed to recover alone in a cage under observation until able to exhibit a righting reflex. The mouse was then returned to its home cage. Buprenorphine (0.05 to 0.10 mg/kg) was given subcutaneously in a volume of 50-200 µL with a saline vehicle every 12 hours as needed for pain. Once the surgical wound healed, approximately 7-10 days, anesthesia was induced with 3 to 5% isoflurane inhaled in a sealed chamber 3-5 minutes or until effect. Sutures were quickly removed and the mouse was allowed to recover alone in a cage under observation until able to exhibit a righting reflex. Treatment with PAMAM-G3 or saline was continued up until 3 weeks after primary tumor resection.

Figure 9:
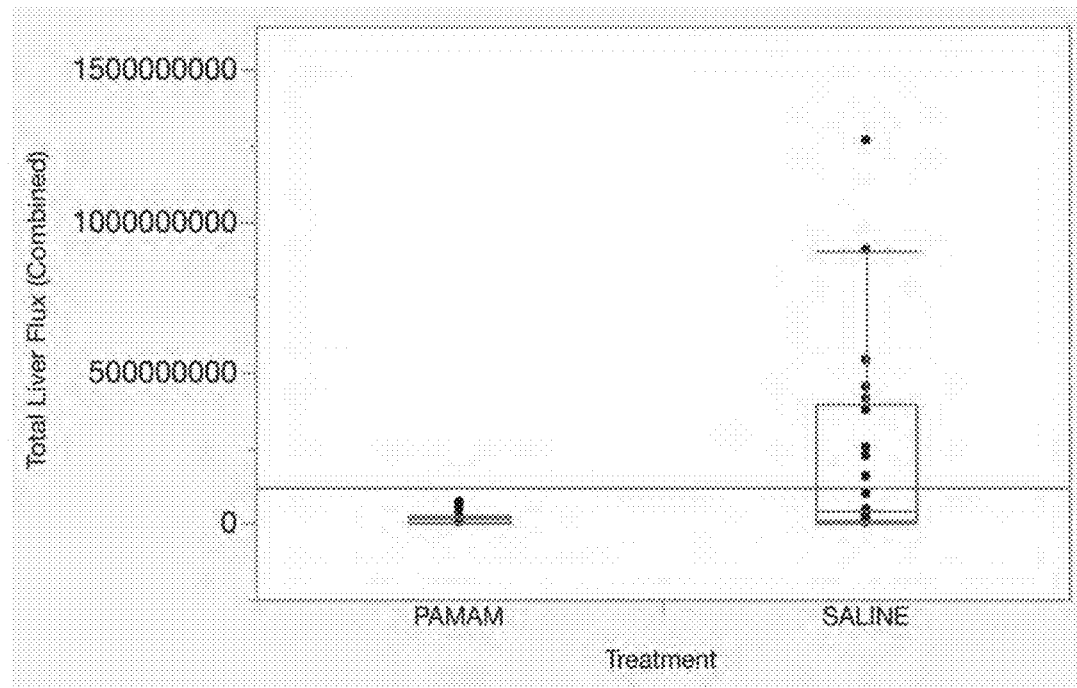
FIG. 9 is a graph showing that PAMAM blocks pancreatic cell invasion into the liver.
Figure 10:
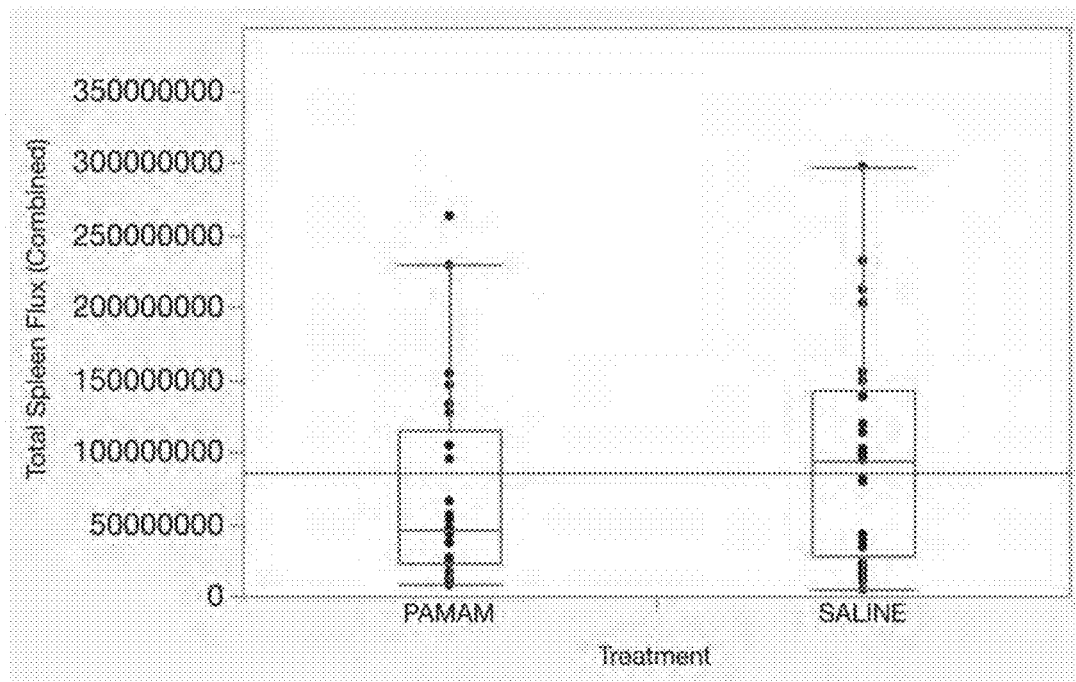
FIG. 10 is a graph showing that PAMAM does not effect pancreatic cell invasion into and growth of cells in the spleen.
Figure 11:
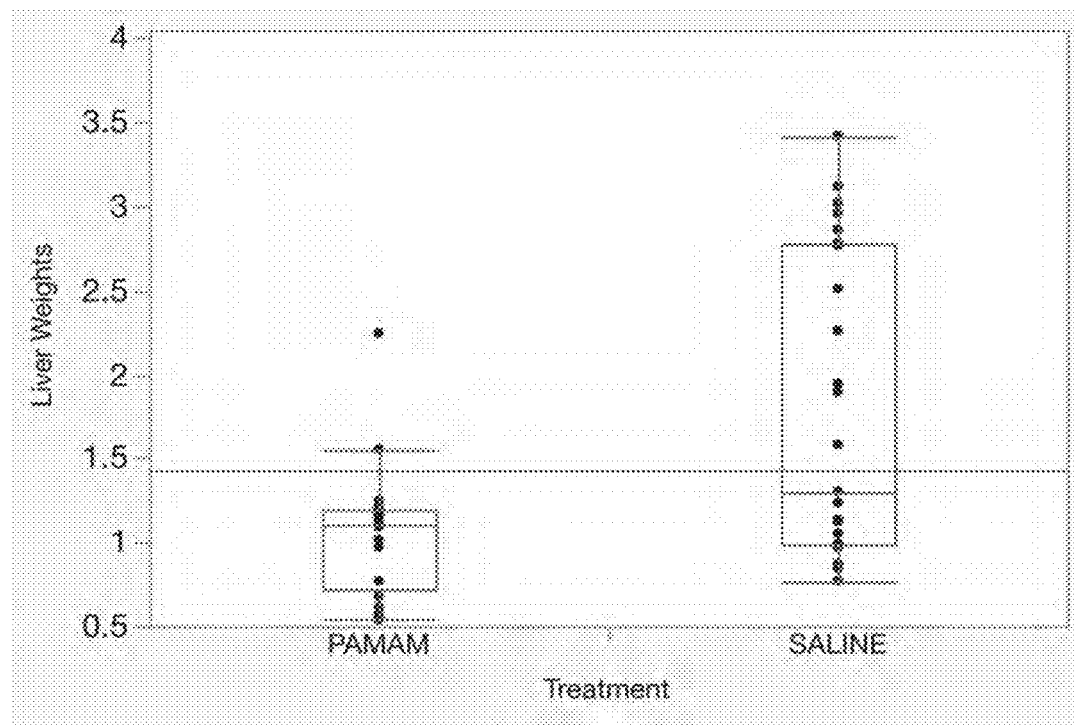
FIG. 11 is a graph showing that the organ weight in the liver is reduced in animals treated with PAMAM.
Figure 12:
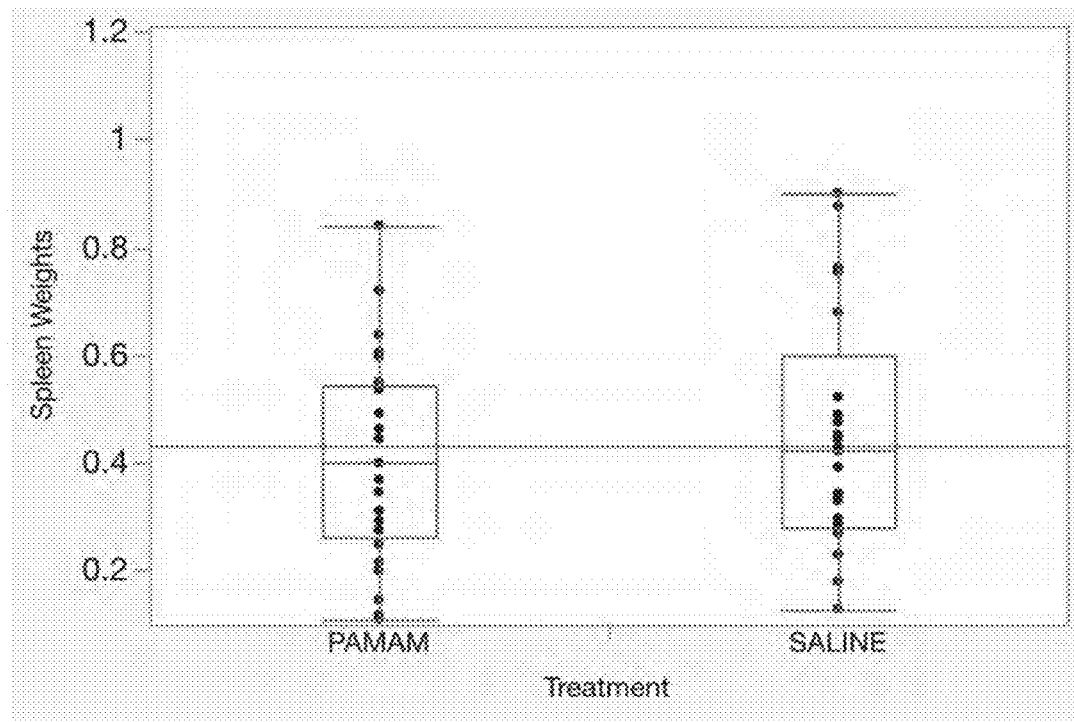
FIG. 12 is a graph showing that the organ weight of the spleen in not affected in animals treated with PAMAM.
Figure 13:
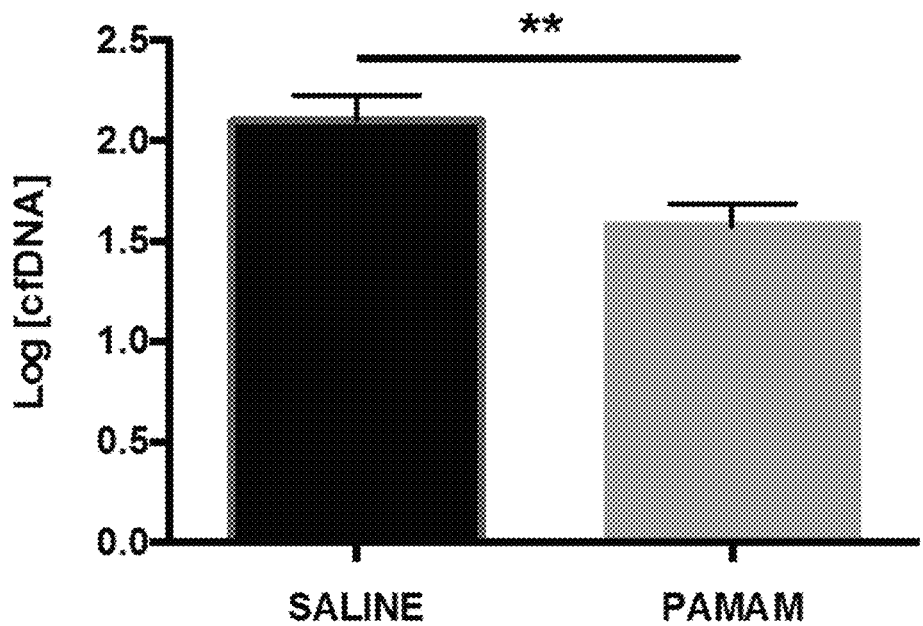
FIG. 13 is a graph showing the cfDNA levels are reduced in KPC mice administered PAMAM.
Figure 14:
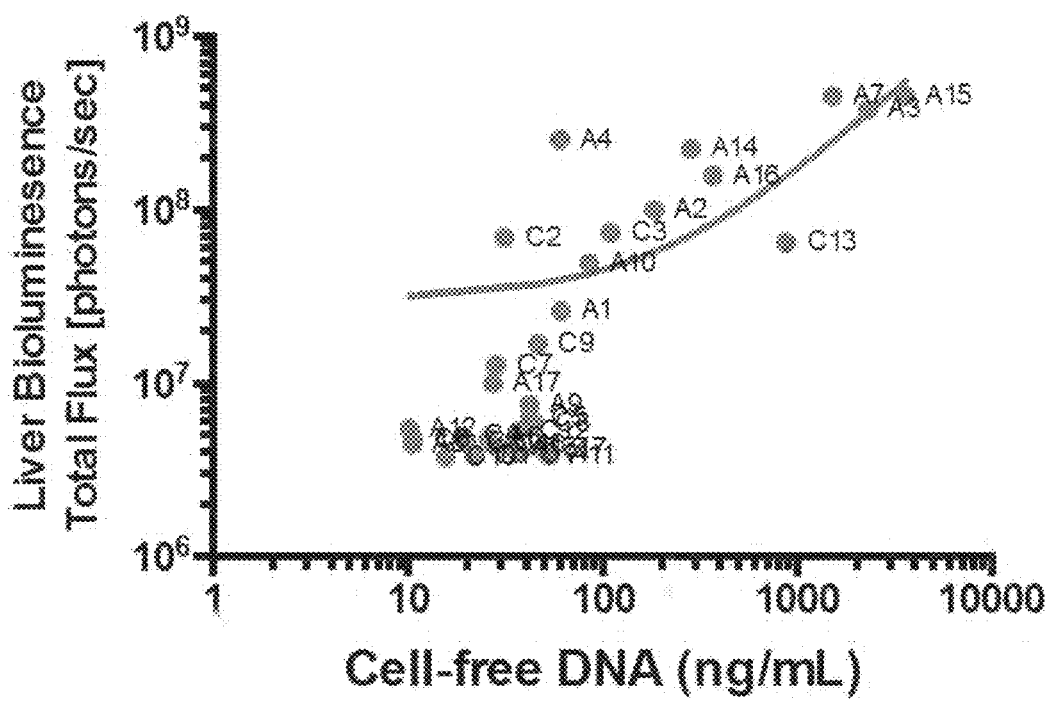
FIG. 14 is a graph showing that the amount of liver bioluminescence of bioluminescent pancreatic cancer cells correlates with the amount of cfDNA.
Figure 15:
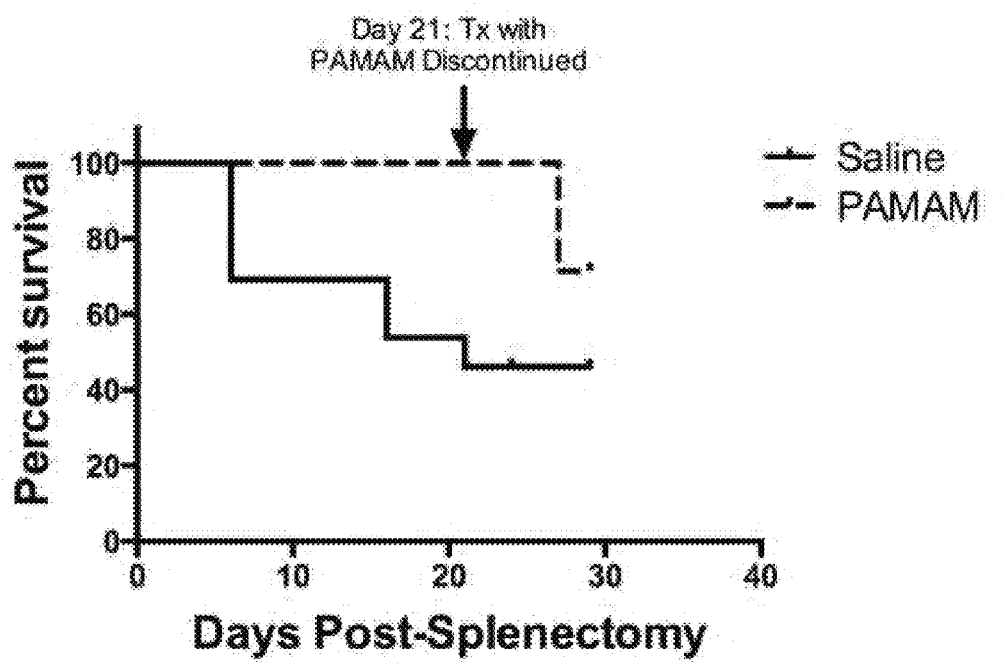
FIG. 15 is a graph showing a survival difference in mice treated with PAMAM post-splenectomy as opposed to saline.

Result: Treatment with PAMAM-G3 significantly reduces liver metastasis in this syngeneic, murine model of pancreatic cancer metastasis. As shown in FIG. 9 luminescence of cancer cells in the liver was not measurable after treatment with PAMAM, but was significantly present in mice treated with saline. As shown in FIG. 11, the reduction in cancer cell luminescence correlated with reduced or near normal weight of the liver in mice treated with PAMAM. As shown in FIGS. 10 and 12, treatment with PAMAM did not lead to a significant effect on the primary tumor growth in the spleens as measured by either cancer cell based luminescence (FIG. 10) or total weight of the spleen (FIG. 12). Additionally, mice treated with PAMAM-G3 demonstrated reduced plasma levels of cfDNA as shown in FIG. 13, and the increased cfDNA levels correlated with increased liver bioluminescence as shown in FIG. 14. This data supports our hypothesis that cfDNA plays a role in tumor progression and metastasis. A survival study shows that cationic polymer treatment prolongs survival following primary tumor resection in our mouse model as well as shown in FIG. 15.

Example 4

Cationic Polymer Binds Pancreatic Cancer Derived MPs

Method: First, KPC-4580P cells were cultured to confluence in 20 T-175 Corning flasks. The flasks were then washed once with PBS (−/−) and the media was replaced with complete medium supplemented with exosome-depleted FBS rather than normal FBS. After 72 hours, the supernatant was collected and centrifuged at 4000 g for 5 min to deplete cell debris. The supernatant was centrifuged at 20,000 g for 20 min at 4° C. The supernatant was saved for exosome isolation. The MP pellet was washed with PBS (−/−) and re-centrifuged at 20,000 g for 20 minutes at 4° C. This supernatant was discarded and the final MP pellet was resuspended in 1 mL PBS, aliquoted and stored at −80° C. The protein concentration of the MPs was quantified via BCA assay. The supernatant from the initial MP spin was centrifuged at 100,000 g for 2 hours at 4° C. The supernatant was discarded and exosomes pellet was washed with PBS and this mixture was re-centrifuged at 100,000 g for 2 hours at 4° C. The supernatant was discarded and the exosome pellet was resuspended in 500 µL of PBS, aliquoted and stored at −80° C. The protein content of the exosomes was quantified via BCA assay.

MPs were isolated from KPC-4580P cells as described above. HEK-TLR 4 and 9 reporter cell lines were purchased from Invivogen. These cells were grown and passaged in congruence with the manufacturer's instructions. These cells were plated in 96-well, clear-bottom, flat-bottom plates. Cells were plated at 100,000 cells per well with at least 5 wells per condition. These cells were then treated for 18-24 hours with either 1) media alone; or 2) MPs @ 50 µg/µL. After this incubation period, the supernatant was collected from the cells and mixed with a proprietary compound (Quantiblue) from Invivogen at a 60:40 vol:vol mixture and incubated for 5 hours at 37 C. in a 96 well plate. The plate was read at 650 nm in an absorbance plate reader. Data was quantified and analyzed using GraphPad Prism software.

The binding of MPs to PAMAM-G3 was quantified using a custom-designed ELISA assay. Corning 96-well High Binding, flat bottom plates were coated overnight at 4° C. with PAMAM-G3 diluted into PBS (−/−) at increasing concentrations in duplicate rows (0 µg/mL, 0.2 µg/mL, 2 µg/mL, and 20 µg/mL). The plate was then blocked using Bovine Serum Albumin (1%) for 2 hours, washed 3× with PBS (−/−), and then exposed to increasing concentrations of MPs in a two-fold dilution series across the rows of the plate (85 µg/mL, 50 µg/mL, etc) for 2 hours. After washing 3× with PBS, the plates were then incubated with an antibody targeting Tissue Factor (known to be expressed on the MP surface) for 1 hour, followed by 3× wash with PBS and subsequent incubation with an appropriate secondary antibody conjugated with HRP for 1 hour. At this point TMB substrate was added to each well and Chemiluminescent readout was then analyzed via plate reader. Statistical analysis was performed on GraphPad PRISM software.

Figure 16:
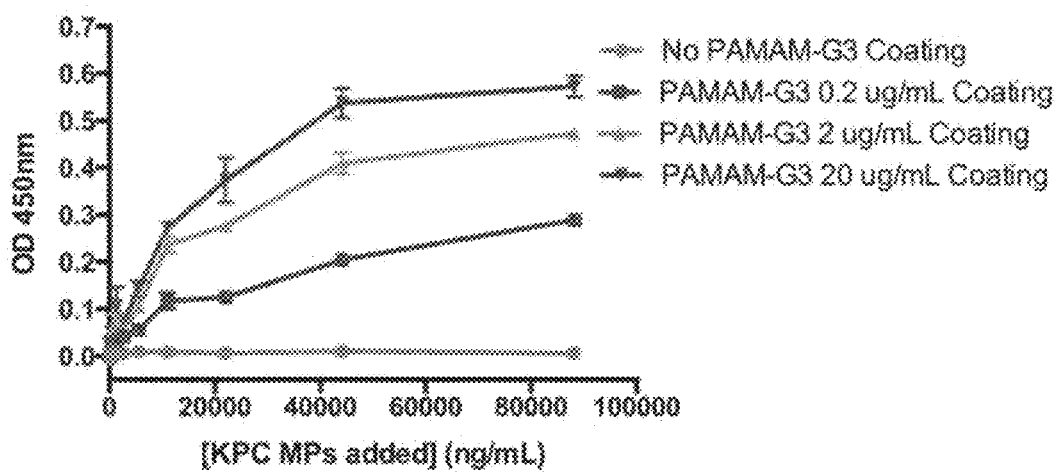
FIG. 16 is a graph showing that PAMAM binds to pancreatic cell derived MPs in a dose-dependent manner.
Figure 21:
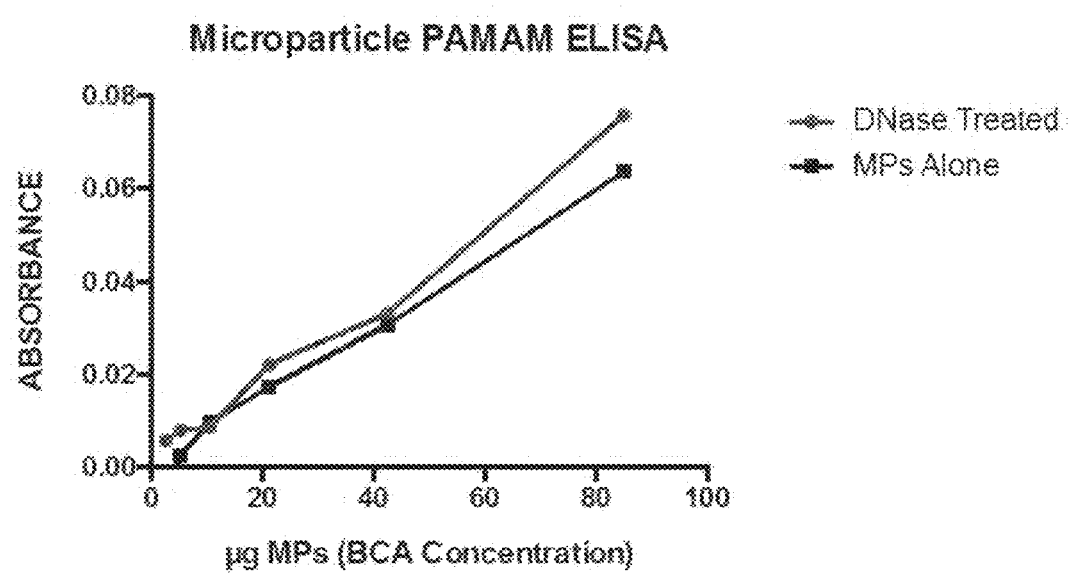
FIG. 21 is a graph showing that MP binding to PAMAM is not affected by DNase treatment.

Result: PAMAM-G3 was able to bind PC cell line derived MPs with high affinity in a dose dependent manner as shown in FIG. 16. In addition, this binding was not affected by DNase treatment of the MPs (FIG. 21). Thus the effect of PAMAM on binding to the MPs cannot be solely attributed to the DNA binding activity of PAMAM.

Example 5

Cationic Polymer Inhibits MP and Exo Induced Pancreatic Cancer Cell Invasion In Vitro Method: MPs and Exos were isolated from PC cancer cell cultures as described above. These particles were then used as agonists in Transwell-matrigel invasion assays. Transwell-Matrigel invasion chambers were purchased from Corning. The invasion chambers were first plated with serum-free media in the top and bottom chambers at 37° C. for a minimum of 1.5 hours to allow the Matrigel to solidify and the two chambers to equilibrate in preparation for the addition of cells and MPs and EXOs. After this time pancreatic cancer cell lines were displaced from their flasks using 3 mLs of 0.25% trypsin (Life Sciences) for 3-5 min at 37° C. The cells were then lifted using a complete media wash and spun down at 200 g for 3-5 min. The supernatant was then removed and the cells were resuspended in 3-5 mL of serum-free media. Cells were then counted using a 1:1 dilution in trypan blue and injection of this solution into a cellometer cell counting strip. The strip was then placed into an automated cellometer and cells were then counted using cell-line specific counting parameters. Cells were then diluted to 125,000 cells per mL. 800 µL of the diluted cell suspension was then loaded into an Eppendorf tube individually preloaded with the following agonists for a total volume of 1000 µL: 1) serum free media alone; 2) serum free media+MPs @ 50 µg/µL; 3) serum free media+MPs @ 50 µg/µL+PAMAM-G3 @ 20 µg/mL; 4) serum free media+EXOs @ 50 µg/µL; 5) serum free media+EXOs @ 50 µg/µL+PAMAM-G3 @ 20 µg/mL; 6) serum free media+CpG ODN @ 4 µM; 7) serum free media+CpG ODN @ 4 µM+PAMAMG3 @ 20 µg/mL. Each tube was then mixed thoroughly by pipetting up and down. The invasion chambers were then removed from the incubators and the media was aspirated from both the top and bottom chambers. 750 µL of complete media was then added to the bottom chambers and 500 µL of each cell mixture was added to the top of two chambers, for a duplicate of each condition. The plated invasion chambers were then incubated at 37° C. and 5% $CO_2$ for 24 hours. At this point the chambers were removed from the incubator and media was aspirated from both the top and bottom chambers. The top chambers were then removed and placed into a new 24-well plate with the bottom chambers pre-loaded with 1 mL of 10% formaldehyde per well. The membrane of the top chamber was fixed in the formaldehyde for 10 minutes. The top chambers were the removed from the fixative and placed into a new 24-well plate preloaded with 1 mL of PBS (−/−) per well. The membranes of the top chamber were kept in PBS for 1 minute for washing purposes. The top chambers were then placed onto absorbent pads and residual PBS was wiped from the inside of the top chambers using a cotton swab. The top chambers were then placed upside down with the membranes facing upward onto the absorbent pads. 10 µL of crystal violet solution were then dropped onto the membranes and allowed to stain for 5 min. The chambers were then washed in DI water and residual crystal violet was wiped from the inside of the chambers using a cotton swab. The membranes were then imaged using an inverted light microscope at 40× magnification. 12 random images of each membrane were taken using an eyepiece camera. The cells in the images were then counted using an ImageJ algorithm unique for each cell line. The cell count numbers were then statistically analyzed via GraphPad Prism software.

Figure 17:
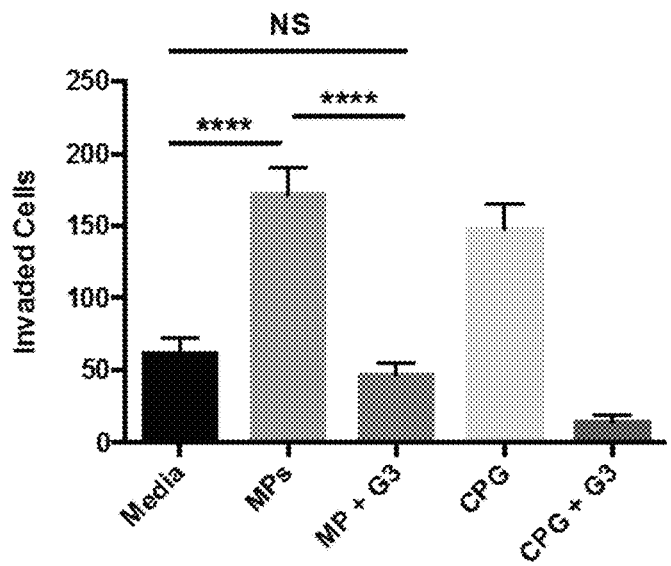
FIG. 17 is a graph showing that MP induced cellular invasion is inhibited by PAMAM.
Figure 18:
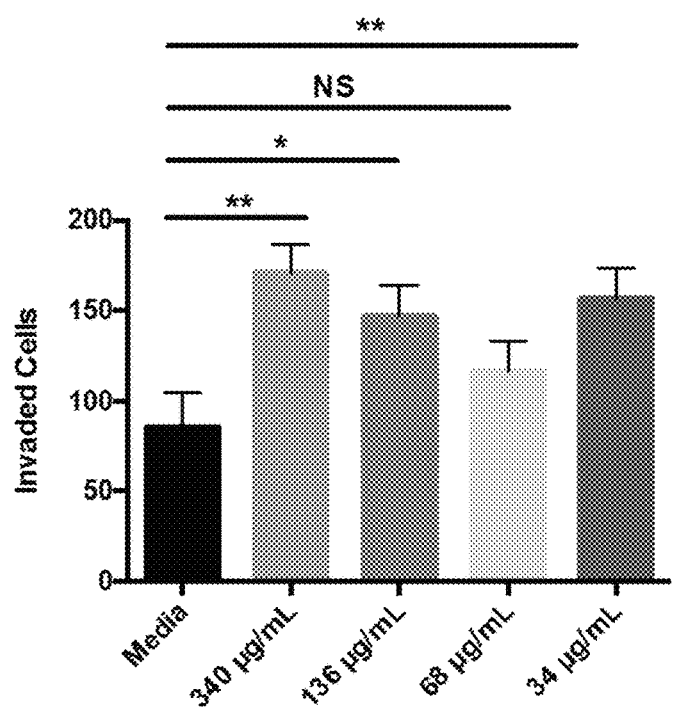
FIG. 18 is a graph showing that MP induced cellular invasion is a somewhat dose dependent effect.
Figure 19:
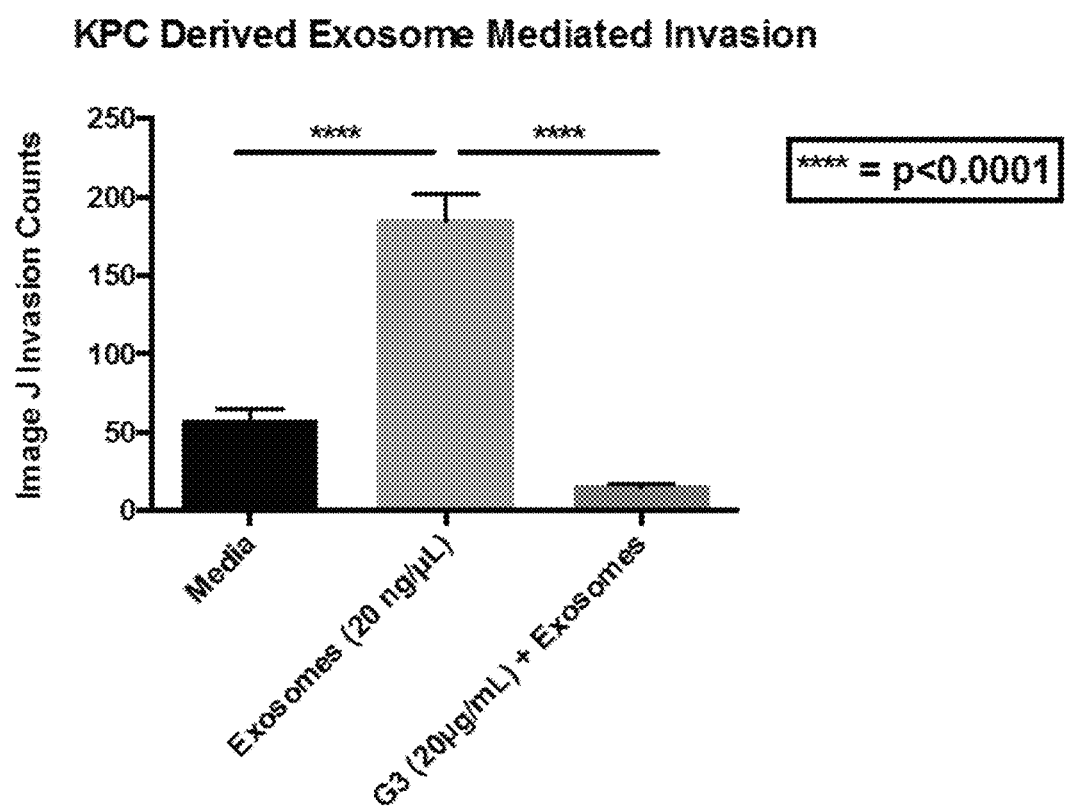
FIG. 19 is a graph showing that KPC derived Exosome mediated invasion is also inhibited by incubation with PAMAM.

Result: Both MPs (FIGS. 17 and 18) and Exosomes (FIG. 19) induced PC tumor cell invasion in vitro. This effect was inhibited with PAMAM-G3 treatment.

Example 6

Cationic Polymers inhibit Microparticle Uptake by Cells

Methods: KPC-4580P cells were plated in 24-well plate at 50,000 cells per well and allowed to grow to confluence. MPs were labelled using a lipophilic PKH-67 green fluorescent dye purchased from Sigma Aldrich using the manufacturer's recommendations. Once labelled, the plated cells were treated in quartet replicates with the following conditions for 20 HRs @ 37 C.: 1) serum-free media alone; 2) serum-free media +labelled MPs @ 50 µg/µL; 3) serum-free media +labelled MPs @ 50 µg/µL. After the incubation was complete, the media was aspirated and all wells were washed 3× with PBS (−/−), then 3× with PBS (−/−) @ pH 2.5 (stripping any unincorporated MPs from the cell surface), and then 3× with PBS (−/−). The cells were then detached for 3 min @ 37° C. with 3 mL of 0.25% trypsin. Media was added to quench the trypsin and the resulting mixture was centrifuged for 5 min @ 200 g. The supernatant was aspirated and the cells were then fixed on ice for 30 min in 4% formalin. The cells were analyzed via FACS with cells alone as a baseline control comparing the fluorescence in the FL1 channel between the three conditions with at least 10,000 events per condition. The resulting data was then analyzed via FlowJo, comparing the geometric means of each conditional population of cells.

Figure 20:
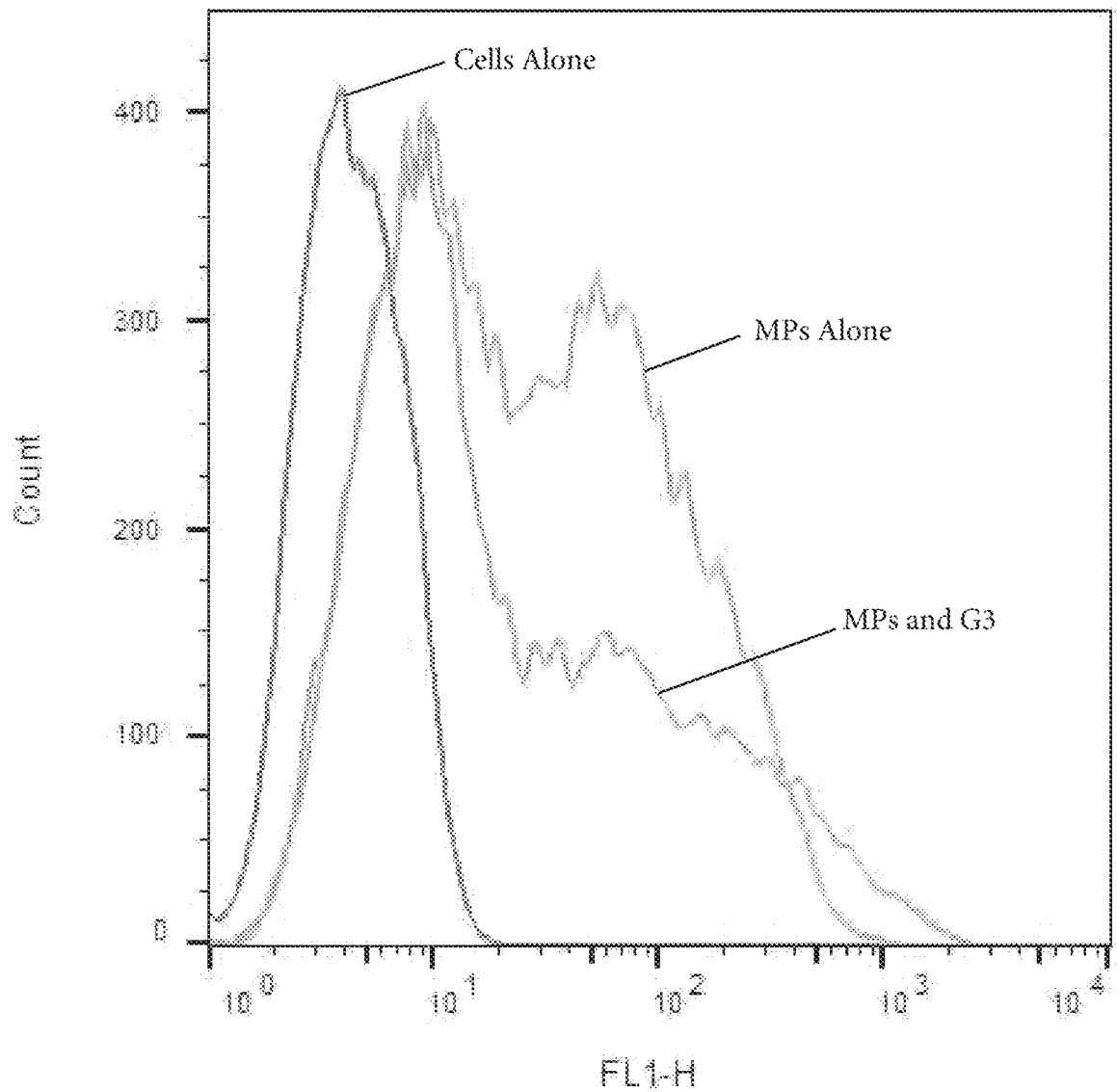
FIG. 20 is a FACS analysis plot showing that PAMAM reduces the uptake of pancreatic cancer produced MPs by naïve cells.

Results: The results are shown in FIG. 20 and demonstrate that the cells incorporated the MPs after the 18-hour incubation as shown by increased fluorescence. In contrast the cells incubated with MPs in the presence of PAMAM incorporated a lower level of MPs.

Implication:

The interface between cationic polymers and cancer is unexplored. Here, we have evidence that suggests the use of a cationic polymer as a multi-faceted potential therapeutic against PC. These data, taken together establish a novel approach to elucidate novel characteristics of PC supported by extensive in vivo and in vitro experiments.

REFERENCES

1. Menck K, Klemm F, Gross J C, Pukrop T, Wenzel D, and Binder C. Induction and transport of Wnt 5a during macrophage-induced malignant invasion is mediated by two types of extracellular vesicles. *Oncotarget.* 2013;4 (11):2057-66.
2. Menck K, Scharf C, Bleckmann A, Dyck L, Rost U, Wenzel D, Dhople V M, Siam L, Pukrop T, Binder C, et al. Tumor-derived microvesicles mediate human breast cancer invasion through differentially glycosylated EMMPRIN. *Journal of Molecular Cell Biology.* 2015;7 (2):143-53.
3. Costa-Silva B, Aiello N M, Ocean A J, Singh S, Zhang H, Thakur B, Becker A, Hoshino A, Mark M, Molina H, et al. Pancreatic cancer exosomes initiate pre-metastatic niche formation in the liver. *Nature Cell Biology.* 2015; 17(6).
4. Hoshino A, Costa-Silva B, Shen T-L, Rodrigues G, Hashimoto A, Mark M, Molina H, Kohsaka S, Giannatale A, Ceder S, et al. Tumour exosome integrins determine organotropic metastasis. *Nature.* 2015;527(7578):329-35.
5. Kaplan R N, Rafii S, and Lyden D. Preparing the "soil": the premetastatic niche. *Cancer research.* 2006;66(23): 11089-93.
6. Jain S, Pitoc G A, Holl E K, Zhang Y, Borst L, Leong K W, Lee J, and Sullenger B. Nucleic acid scavengers inhibit thrombosis without increasing bleeding. *Proceedings of the National Academy of Sciences.* 2012;109(32).
7. Jaewoo L, Jang Wook S, Ying Z, Kam W L, David P, and Bruce A S. Nucleic acid-binding polymers as anti-inflammatory agents. *Proceedings of the National Academy of Sciences.* 2011;108(34):14055-60.
8. Holl E K, Bond J E, Selim M A, Ehanire T, Sullenger B, and Levinson H. The Nucleic Acid Scavenger Polyamidoamine Third-Generation Dendrimer Inhibits Fibroblast Activation and Granulation Tissue Contraction. *Plastic and Reconstructive Surgery.* 2014;134(3):420-33.
9. Raimondi S, Maisonneuve P, and Lowenfels A B. Epidemiology of pancreatic cancer: an overview. *Nature reviews Gastroenterology & hepatology.* 2009;6(12):699-708.
10. Schwarzenbach H, Hoon D S B, and Pantel K. Cell-free nucleic acids as biomarkers in cancer patients. *Nature Reviews Cancer.* 2011.
11. Klaus J, Michael F, and Anja R. Cell-free DNA in the blood as a solid tumor biomarker—a critical appraisal of the literature. *Clinica chimica acta; international journal of clinical chemistry.* 2010;411(21-22):1611-24.
12. Oliver J S, Debora M I F, Christoph S, Oliver S, Christian J G, Ulrich H, Michael B, Axel-Mario F, Volker H, Barbara S, et al. Prediction of response to neoadjuvant chemotherapy in breast cancer patients by circulating apoptotic biomarkers nucleosomes, DNAse, cytokeratin-18 fragments and survivin. *Cancer letters.* 2013;336(1): 140-8.
13. Zitt M, Müller H M, Rochel M, Schwendinger V, and Zitt M. Circulating cell-free DNA in plasma of locally advanced rectal cancer patients undergoing preoperative chemoradiation: a potential diagnostic tool for therapy . . . *Disease markers.* 2008.
14. Ashutosh K P, Manisha B, Sachin K, Anant M, and Randeep G. Circulating Cell-Free DNA in Plasma/Serum of Lung Cancer Patients as a Potential Screening and Prognostic Tool. *Clinical Chemistry.* 2006.
15. Luis A D, and Alberto B. Liquid Biopsies: Genotyping Circulating Tumor DNA. *Journal of Clinical Oncology.* 2014;32(6):579-86.
16. Oliver G, and Eva M. The expanding world of extracellular traps: not only neutrophils but much more. *Frontiers in Immunology.* 2013;3(
17. Luc H B, Anne-Claire D, Nathalie C, Denis S, Nicolas M, James B, Alexandre P, Matthieu R, Gajendra S N, Tania L, et al. Platelets release mitochondria serving as substrate for bactericidal group IIA-secreted phospholipase A2 to promote inflammation. *Blood.* 2014;124(14): 2173-83.
18. Shashank J, John H, and Jerry W. Platelets: linking hemostasis and cancer. *Arteriosclerosis, thrombosis, and vascular biology.* 2010;30(12):2362-7.
19. Mélanie D, Daniela S K, Daphne S, Kimberly M, Jaymie R V, Tobias A F, David T S, and Denisa D W. Cancers predispose neutrophils to release extracellular DNA traps that contribute to cancer-associated thrombosis. *Proceedings of the National Academy of Sciences.* 2012;109(32).
20. Holdenrieder S, Nagel D, Schalhorn A, Heinemann V, Wilkowski R, Pawel J, Raith H, Feldmann K, Kremer A E, Müller S, et al. Clinical Relevance of Circulating Nucleosomes in Cancer. *Annals of the New York Academy of Sciences.* 2008;1137(1).
21. Catarino R, Ferreira M M, Rodrigues H, Coelho A, Nogal A, Sousa A, and Medeiros R. Quantification of free circulating tumor DNA as a diagnostic marker for breast cancer. *DNA and cell biology.* 2008;27(8):415-21.
22. Daniel J M, Mark B, Amanda E W, Benjamin M H, Natalie L, Doug W S, and Zsolt J B. Cell necrosis—independent sustained mitochondrial and nuclear DNA release following trauma surgery. *Journal of Trauma and Acute Care Surgery.* 2015;78(2).
23. Merrell M A, Ilvesaro J M, Lehtonen N, Sorsa T, Gehrs B, Rosenthal E, Chen D, Shackley B, Harris K W, and Selander K S. Toll-like receptor 9 agonists promote cellular invasion by increasing matrix metalloproteinase activity. *Molecular cancer research:MCR.* 2006;4(7): 437-47.
24. Wen F, Shen A, Choi A, Gerner E W, and Shi J. Extracellular DNA in Pancreatic Cancer Promotes Cell Invasion and Metastasis. *Cancer Research.* 2013;73(14).
25. Ren T, Wen Z -K, Liu Z -M, Liang Y -J, Guo Z -L, and Xu L. Functional expression of TLR9 is associated to the metastatic potential of human lung cancer cell. *Cancer Biology & Therapy.* 2007;6(11).
26. Kaisho T, and Akira S. Toll-like receptor function and signaling. *The Journal of allergy and clinical immunology.* 2006;117(5):979.
27. Rakoff-Nahoum S, and Medzhitov R. Toll-like receptors and cancer. *Nature reviews Cancer.* 2009;9(1):57-63.
28. Zhang J -Z, Liu Z H I, Liu J I A, Ren J -X, and Sun T -S. Mitochondrial DNA induces inflammation and increases TLR9/NF-κB expression in lung tissue. *International Journal of Molecular Medicine.* 2014;33(4).
29. Schwartz A L, Malgor R, Dickerson E, Weeraratna A T, Slominski A, Wortsman J, Harii N, Kohn A D, Moon R T, Schwartz F L, et al. Phenylmethimazole Decreases Toll-Like Receptor 3 and Noncanonical Wnt5a Expression in Pancreatic Cancer and Melanoma Together with Tumor Cell Growth and Migration. *Clinical Cancer Research.* 2009;15(12):4114-22.
30. Ochi A, Graffeo C S, Zambirinis C P, Rehman A, Hackman M, Fallon N, Barilla R M, Henning J R, Jamal M, Rao R, et al. Toll-like receptor 7 regulates pancreatic carcinogenesis in mice and humans. *Journal of Clinical Investigation.* 2012;122(11).
31. Yu M, Wang H, Ding A, Golenbock D T, Latz E, Czura C J, Fenton M J, Tracey K J, and Yang H. HMGB1 signals through toll-like receptor (TLR) 4 and TLR2. *Shock (Augusta, Ga).* 2006;26(2):174-9.
32. Kang R, Tang D, Schapiro N E, Loux T, Livesey K M, Billiar T R, Wang H, Houten B V, Lotze M T, and Zeh H J. The HMGB1/RAGE inflammatory pathway promotes pancreatic tumor growth by regulating mitochondrial bioenergetics. *Oncogene.* 2013;33(5):567-77.
33. Urbonaviciute V, Fürnrohr B G, Meister S, Munoz L, Heyder P, De Marchis F, Bianchi M E, Kirschning C, Wagner H, Manfredi A A, et al. Induction of inflammatory and immune responses by HMGB1-nucleosome complexes: implications for the pathogenesis of SLE. *The Journal of experimental medicine.* 2008;205(13):3007-18.
34. Jain S, Pitoc G A, Holl E K, Zhang Y, Borst L, Leong K W, Lee J, and Sullenger B A. Nucleic acid scavengers inhibit thrombosis without increasing bleeding. *Proceedings of the National Academy of Sciences.* 2012;109(32).
35. Jaewoo L, Jang Wook S, Ying Z, Kam W L, David P, and Bruce A S. Nucleic acid-binding polymers as anti-inflammatory agents. *Proceedings of the National Academy of Sciences.* 2011;108(34):14055-60.
36. Holl E K, Bond J E, Selim M A, Ehanire T, Sullenger B, and Levinson H. The Nucleic Acid Scavenger Polyamidoamine Third-Generation Dendrimer Inhibits Fibroblast Activation and Granulation Tissue Contraction. *Plastic and Reconstructive Surgery.* 2014;134(3):420-33.
37. Costa-Silva B, Aiello N M, Ocean A J, Singh S, Zhang H, Thakur B, Becker A, Hoshino A, Mark M, Molina H, et al. Pancreatic cancer exosomes initiate pre-metastatic niche formation in the liver. *Nature Cell Biology.* 2015; 17(6).
38. Hoshino A, Costa-Silva B, Shen T -L, Rodrigues G, Hashimoto A, Mark M, Molina H, Kohsaka S, Giannatale A, Ceder S, et al. Tumour exosome integrins determine organotropic metastasis. *Nature.* 2015;527(7578):329-35.
39. Kaplan R N, Rafii S, and Lyden D. Preparing the "soil": the premetastatic niche. *Cancer research.* 2006;66(23): 11089-93.
40. Yang L, Wu X -H, Wang D, Luo C -L, and Chen L -X. Bladder cancer cell-derived exosomes inhibit tumor cell apoptosis and induce cell proliferation in vitro. *Molecular medicine reports.* 2013;8(4):1272-8.
41. Franzen C A, Simms P E, Huis A F, Foreman K E, Kuo P C, and Gupta G N. Characterization of Uptake and Internalization of Exosomes by Bladder Cancer Cells. *BioMed Research International.* 2014;2014(1-11.
42. Janowska-Wieczorek A, Marquez-Curtis L A, Wysoczynski M, and Ratajczak M Z. Enhancing effect of platelet-derived microvesicles on the invasive potential of breast cancer cells. *Transfusion.* 2006;46(7):1199-209.
43. Janowska-Wieczorek A, Wysoczynski M, Kijowski J, Marquez-Curtis L, Machalinski B, Ratajczak J, and Ratajczak M Z. Microvesicles derived from activated platelets induce metastasis and angiogenesis in lung cancer. *International Journal of Cancer.* 2005;113(5):752-60.
44. Menck K, Klemm F, Gross J C, Pukrop T, Wenzel D, and Binder C. Induction and transport of Wnt 5a during macrophage-induced malignant invasion is mediated by two types of extracellular vesicles. *Oncotarget.* 2013;4 (11):2057-66.
45. Menck K, Scharf C, Bleckmann A, Dyck L, Rost U, Wenzel D, Dhople V M, Siam L, Pukrop T, Binder C, et al. Tumor-derived microvesicles mediate human breast cancer invasion through differentially glycosylated EMMPRIN. *Journal of Molecular Cell Biology.* 2015;7 (2):143-53.

We claim:

1. A method of treating pancreatic cancer in a subject, the method comprising:
administering a therapeutically effective amount of a polycationic polymer to the subject, wherein the polycationic polymer is selected from the group consisting of PPA-DPA, CDP, CDP-Im, PAMAM, and HDMBr; and
surgically removing at least a portion of the cancer from the subject in conjunction with administering the polycationic polymer,
wherein before administering the polycationic polymer and surgically removing at least a portion of the cancer; the method further comprises (a) obtaining a sample from a subject; (b) adding a polycationic polymer to the sample; (c) determining a level of at least one marker selected from exosomes and nucleosomes in the sample; and (d) selecting the subject for treatment when cancer is detected.

2. The method of claim 1, wherein the polycationic polymer is administered to the subject via a route selected from the group consisting of oral, topical, intranasal, intraperitoneal, parenteral, intravenous, intramuscular, subcutaneous, intrathecal, transcutaneous, nasopharyngeal, intratumoral, and transmucosal.

3. The method of claim 1, wherein the polycationic polymer comprises a crosslinker.

4. The method of claim 3, wherein the crosslinker links the polycationic polymer to a binding label or a detectable label.

5. The method of claim 1, wherein metastatic growth of the cancer is inhibited.

6. The method of claim 1, further comprising administering a cancer therapeutic agent or radiation to the subject.

7. The method of claim 6, wherein the cancer therapeutic agent or radiation is administered before, after or concurrent with the application of the polycationic polymer.

8. The method of claim 1, wherein the polycationic polymer binds to exosomes.

9. The method of claim 1, further comprising obtaining more than one sample from the subject over a period of time; determining the level of at least one marker selected from exosomes and nucleosomes in each of the samples; comparing the levels of the at least one of exosomes and nucleosomes in the samples from the subject over the period of time, wherein increasing exosomes or nucleosomes over the period of time in the samples from the subject is indicative of metastasis or advancing cancer.

10. The method of claim 1, further comprising administering the polycationic polymer to the subject before step (a).

* * * * *